US010189510B1

(12) United States Patent
Higgins

(10) Patent No.: US 10,189,510 B1
(45) Date of Patent: Jan. 29, 2019

(54) STAKE POCKET INSERT

(71) Applicant: Toyota Motor Engineering & Manufacturing North America, Inc., Erlanger, KY (US)

(72) Inventor: Christopher M. Higgins, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/660,048

(22) Filed: Jul. 26, 2017

(51) Int. Cl.
*B62D 33/02* (2006.01)

(52) U.S. Cl.
CPC ................ *B62D 33/0207* (2013.01)

(58) Field of Classification Search
CPC .................................................. B62D 33/0207
USPC ............... 296/3, 43; 224/404; 410/101, 110
See application file for complete search history.

(56) References Cited

U.S. PATENT DOCUMENTS

| 440,169 | A | * | 11/1890 | Lawrence | .......... | B62D 33/0207 |
| | | | | | | 296/43 |
| 2,731,292 | A | | 1/1956 | Cole | | |
| 3,764,177 | A | * | 10/1973 | Woodward | ............... | B60J 7/102 |
| | | | | | | 105/390 |
| 3,841,695 | A | * | 10/1974 | Woodward | ............ | B60P 7/0892 |
| | | | | | | 105/390 |
| 5,141,277 | A | * | 8/1992 | Alexander | ............ | B60P 7/0807 |
| | | | | | | 296/43 |
| 5,154,463 | A | * | 10/1992 | Hershey | .................. | B60P 1/003 |
| | | | | | | 293/128 |
| 6,474,616 | B2 | * | 11/2002 | Yamada | ............. | B60N 2/01508 |
| | | | | | | 248/503.1 |
| 6,945,589 | B2 | * | 9/2005 | Quesenberry | ............ | B60J 7/106 |
| | | | | | | 296/100.02 |
| 2009/0133616 | A1 | * | 5/2009 | Karnes | ............... | B62D 33/0207 |
| | | | | | | 116/173 |
| 2010/0072780 | A1 | * | 3/2010 | Barna | .................... | B62D 33/02 |
| | | | | | | 296/184.1 |

OTHER PUBLICATIONS handymanhowto.com, "How to Install an Old Work Low Voltage Mounting Bracket", Retrieved from Internet: <https://www.handymanhowto.com/how-to-install-an-old-work-low-voltage-mounting-bracket/>, Retrieved Jul. 24, 2017, 24 pages.

\* cited by examiner

*Primary Examiner* — Gregory A Blankenship
(74) *Attorney, Agent, or Firm* — Christopher G. Darrow; Darrow Mustafa PC

(57) ABSTRACT

A stake pocket insert is structured to be positionable in a stake pocket of a vehicle cargo bed side wall. The stake pocket insert includes a stake receptacle defining a stake-receiving cavity and a mounting member secured to the stake receptacle and structured to define an opening leading from an exterior of the stake pocket insert into the stake-receiving cavity. A stake securement mechanism is mounted along a first portion of the stake pocket insert. The stake securement mechanism is structured to be operable to press against a stake positioned in the stake-receiving cavity so as to bias the stake against a bearing surface, thereby securing the stake within the stake receptacle between the stake securement mechanism and the bearing surface.

20 Claims, 15 Drawing Sheets

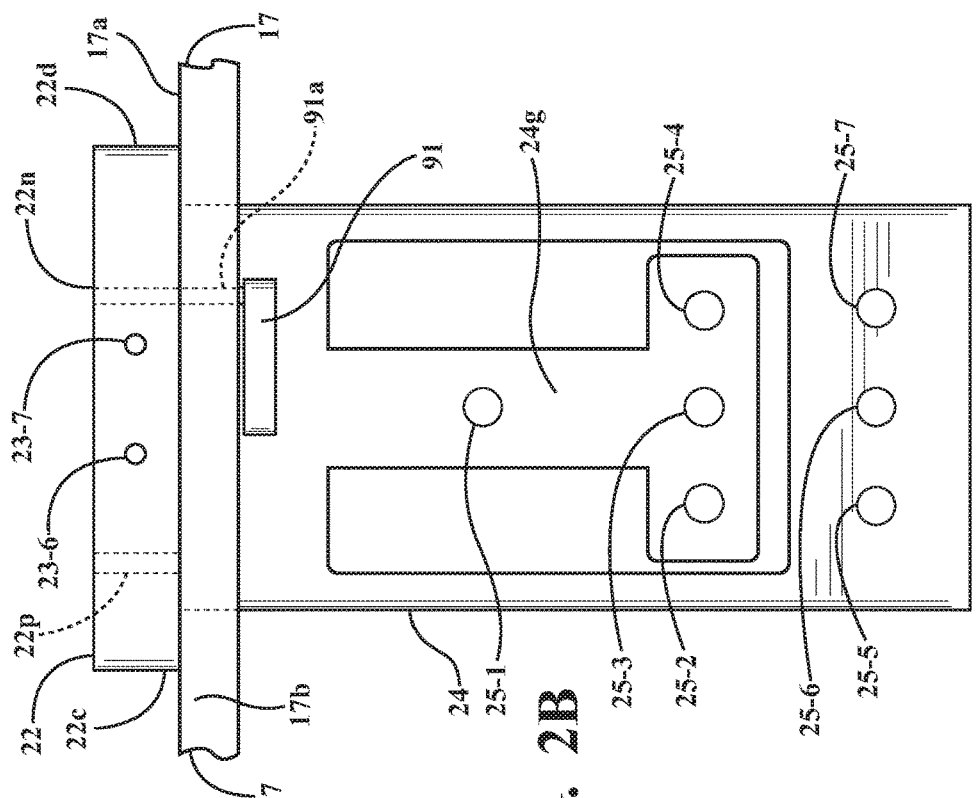
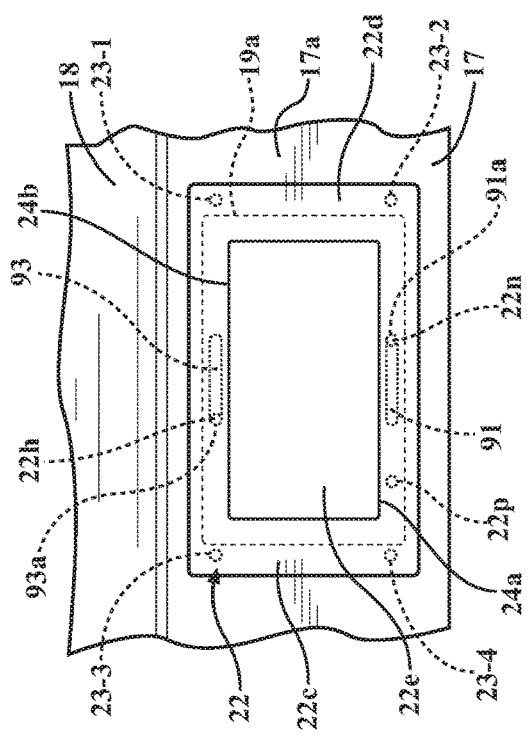
FIG. 2B
FIG. 2A

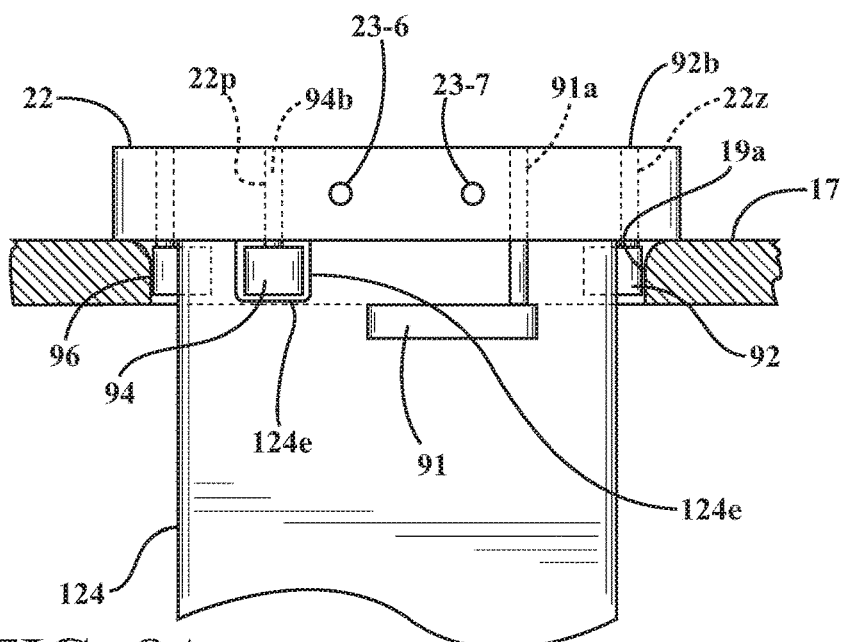
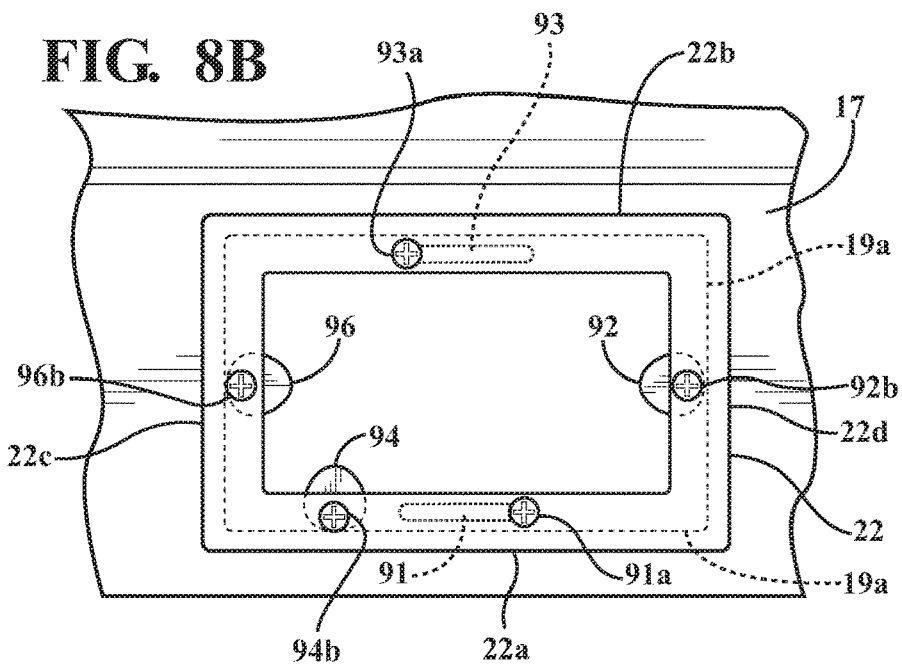

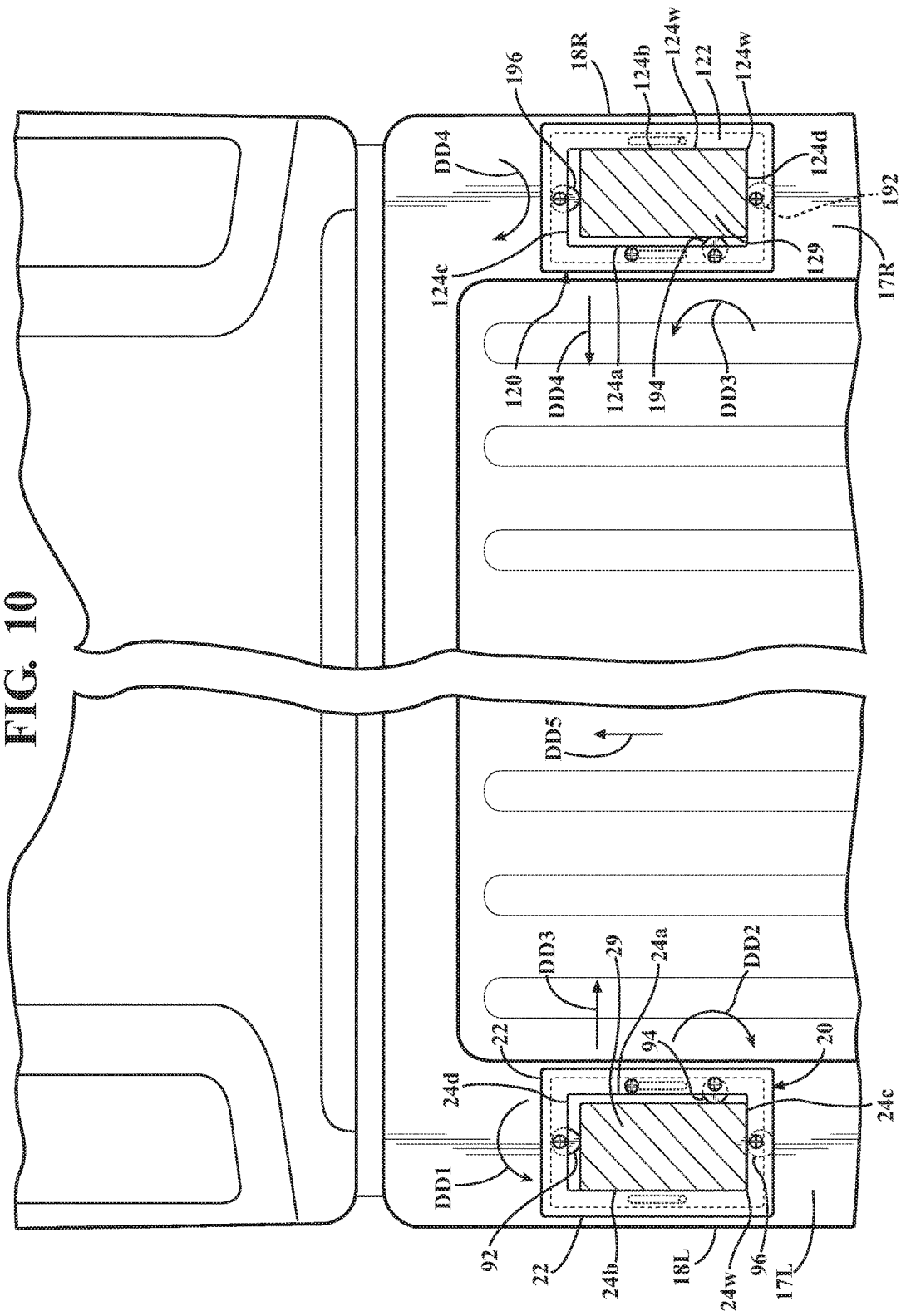

STAKE POCKET INSERT

TECHNICAL FIELD

The present invention relates to vehicle cargo bed side wall accessories, and specifically to an auxiliary stake pocket insert positionable in a stake pocket of a vehicle cargo bed sidewall, to provide a receptacle for a removable stake or post.

BACKGROUND

Pickup trucks may be manufactured with stake pockets that run through upper sections of the cargo bed sidewalls. The stake pockets permit stakes to be mounted and secured to sidewalls of the truck, to enable a user to install a rack or frame onto the cargo bed to store ladders or other tools over the bed, for example. Associated mounting brackets may be provided to secure lower portions of the stakes to a sidewall of the truck. At the customer's discretion, the stake mounting and securement features may not be included in the vehicle when purchased. For trucks not including stake mounting and securement features, an add-on device may be provided for mounting and securing the stakes on the truck for users who desire this feature at a later time. However, existing aftermarket brackets or add-on devices used to assist in mounting and securing stakes on the truck may not offer the degree of stake stability, securement, and support provided by typical built-in stake mounting and securement features.

SUMMARY

In one aspect of the embodiments described herein, a stake pocket insert is provided. The stake pocket insert is structured to be positionable in a stake pocket of a vehicle cargo bed side wall. The stake pocket insert includes a stake receptacle defining a stake-receiving cavity and a mounting member secured to the stake receptacle and structured to define an opening leading from an exterior of the stake pocket insert into the stake-receiving cavity. A stake securement mechanism is mounted along a first portion of the stake pocket insert. The stake securement mechanism is structured to be operable to press against a stake positioned in the stake-receiving cavity so as to bias the stake against a bearing surface, and so as to secure the stake within the stake receptacle between the stake securement mechanism and the bearing surface.

In another aspect of the embodiments described herein, a stake pocket insert is provided. The stake pocket insert is structured to be positionable in a stake pocket of a vehicle cargo bed side wall. The stake pocket extends between a first surface of the vehicle cargo bed side wall and a second surface of the vehicle cargo bed side wall opposite the first surface. The stake pocket insert includes a stake receptacle defining a stake-receiving cavity. A mounting member is secured to the stake receptacle and is structured to define an opening leading from an exterior of the stake pocket insert into the stake-receiving cavity. At least a first clamp and a second clamp are provided. Each clamp is structured and mounted to the mounting member by an associated threaded member so as to be insertable into the stake pocket along the first surface of the vehicle cargo bed side wall and past the second surface of the vehicle cargo bed side wall to an exterior of the stake pocket. Each clamp is also structured and mounted to the mounting member so as to be rotatable in a respective rotation direction to position a portion of the clamp directly opposite the second surface of the vehicle cargo bed side wall. Each clamp is also structured and mounted to the mounting member such that rotation of the associated threaded member after the portion of the clamp is positioned directly opposite the second surface of the vehicle cargo bed side wall reduces a distance between the clamp and the mounting member until the mounting member abuts the first surface of the vehicle cargo bed side wall and the clamp abuts the second surface of the vehicle cargo bed side wall, thereby securing the mounting member to the vehicle cargo bed side wall.

BRIEF DESCRIPTION OF THE DRAWINGS

FIG. 2A is a schematic plan view of a stake pocket insert in accordance with an embodiment described herein, positioned in a stake pocket and with associated stake pocket insert securement clamps positioned in an orientation suitable for insertion into the stake pocket.

FIG. 2B is a schematic side view of the stake pocket insert arrangement shown in FIG. 2A.

FIG. 8A is a schematic partial side cross-sectional view showing an embodiment of the stake pocket insert in which the cams may reside at least partially within a stake pocket when the stake pocket insert is inserted into the stake pocket.

FIG. 8B is a schematic plan view of the stake pocket insert in FIG. 8A, showing an arrangement of cams and clamps oriented to facilitate insertion of the stake pocket insert into a stake pocket in a vehicle sidewall.

FIG. 10 is a schematic plan view of a portion of a vehicle cargo bed showing stake pocket inserts positioned in respective stake pockets in rails along opposite sidewalls of a cargo bed.

DETAILED DESCRIPTION

Figure 1:
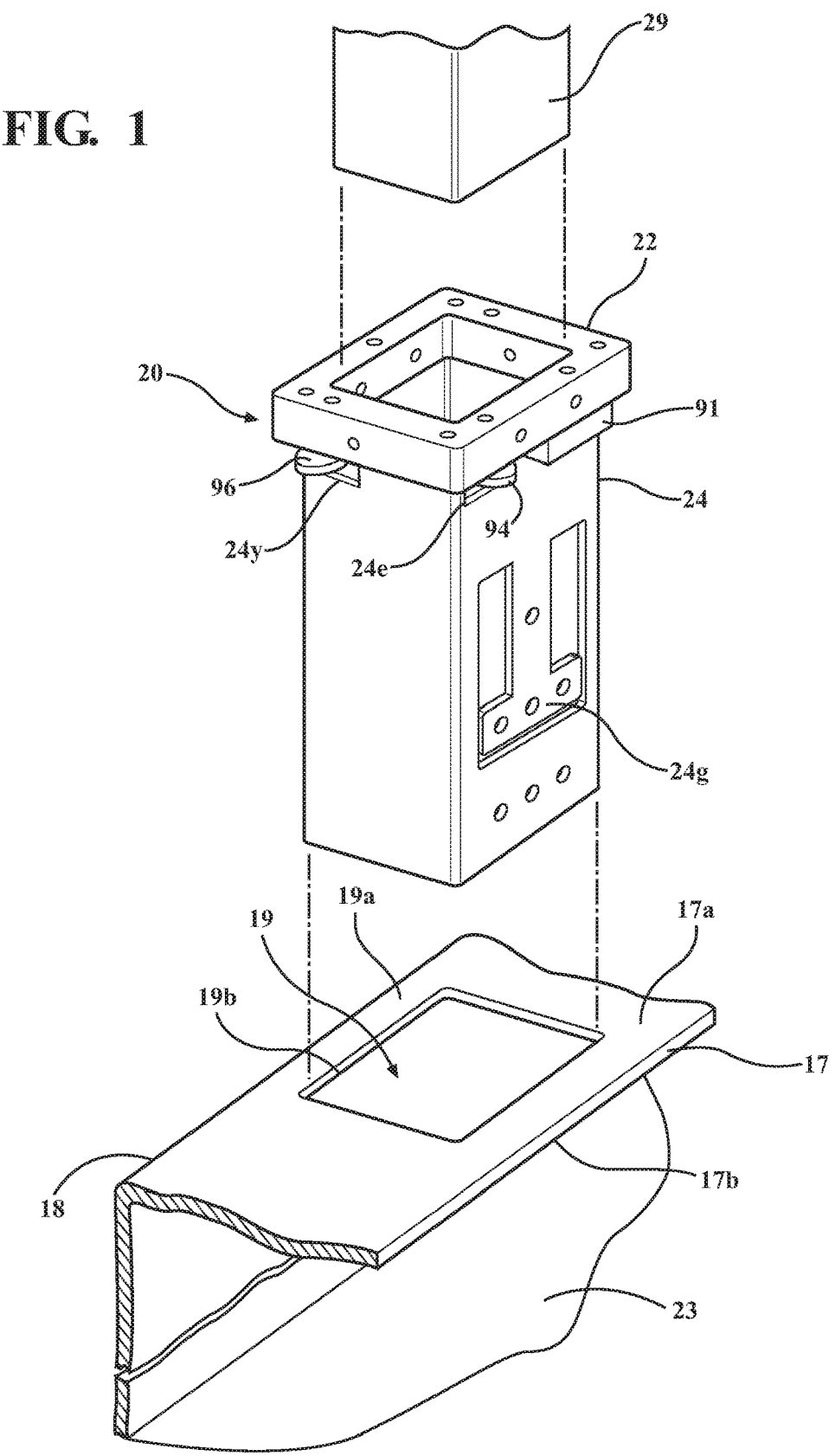
FIG. 1 is a schematic perspective view showing insertion of a stake pocket insert in accordance with an embodiment described herein, into a stake pocket formed in a sidewall of a pickup truck.

Embodiments described herein relate to a stake pocket insert securable in a stake pocket formed in a sidewall of a vehicle, such as a pickup truck. The stake pocket extends between first and second surfaces of a portion of the sidewall. The stake pocket insert includes a stake receptacle defining a stake-receiving cavity. A mounting member is secured to the stake receptacle and is structured to define an opening leading from an exterior of the stake pocket insert into the stake-receiving cavity. To secure the stake pocket insert to the sidewall, first and second clamps are attached to the mounting member using associated threaded members. Each clamp may be inserted into the stake pocket along the sidewall portion first surface and through the stake pocket until the clamp resides below the sidewall portion second surface. The mounting member may rest against the first surface of the sidewall portion. Each clamp is rotatable with respect to the mounting member and the vehicle sidewall so as to enable a first portion of the clamp to be positioned directly opposite the second surface of the sidewall portion, while a second portion of the clamp resides opposite the mounting member. When the clamp threaded members are rotated, each clamp is pulled into contact with the second surface of the sidewall portion. Further rotation of the threaded members presses the sidewall portion between the clamp and the mounting member, thereby securing the mounting member (and the associated stake pocket insert) to the portion of the sidewall. The stake pocket insert may also include cams mounted along walls of the stake receptacle and projecting into an interior of the stake receptacle. The cams are rotatable to engage a stake inserted into the receptacle interior, thereby securing the stake within the stake receptacle. The stake pocket insert enables various types of stakes to be attached to the vehicle along the sidewalls. As an alternative to cams, the stake pocket insert may include pressure members which may be mounted to the mounting member, and which may be movable so as to press against the stake, to bias the stake against one or more associated bearing surfaces, thereby securing the stake between the pressure members and the bearing surfaces.

In some views, certain features of a component of the stake pocket insert may be omitted from the view in order to focus the description on other aspects of the stake pocket insert. It will be understood, however, that the component includes features of the component not shown in the particular view. Such features may be shown, for example, in a detail view of the component.

FIGS. 1-12 illustrate various aspects of a stake pocket insert 20 in accordance with embodiments described herein. FIGS. 1-12 illustrate the numerous features which may be incorporated into various embodiments of the stake pocket insert. Different embodiments of the stake pocket insert may include all of the features shown and described or any number and/or combination of the features described, depending on the requirements of a given end-use application.

FIG. 1 is a schematic perspective view showing insertion of the stake pocket insert 20 into a stake pocket 19. Referring to FIG. 1, the stake pocket insert 20 may be structured to be positionable and securable in a stake pocket 19 of a vehicle cargo bed side wall 18. As known in the art, the cargo bed sidewall 18 may include a ledge or rail 17 extending along a top edge of the sidewall 18. A flat first or upper surface 17a may be formed along the sidewall rail 17. The stake pocket 19 is formed by an opening which may have a first edge 19a along the sidewall first surface 17a and a second edge 19b opposite the first edge 19a along a second surface 17b of the cargo bed sidewall 18 opposite the first surface 17a. In embodiments described herein, the stake pocket insert 20 may include a mounting member 22 and a stake receptacle 24 secured to the mounting member 22. The mounting member 22 and the stake receptacle 24 may be separate elements which are secured together to form the stake pocket insert, or the mounting member 22 and the stake receptacle 24 may be formed as a single piece, from a polymer material, for example.

Figure 5:
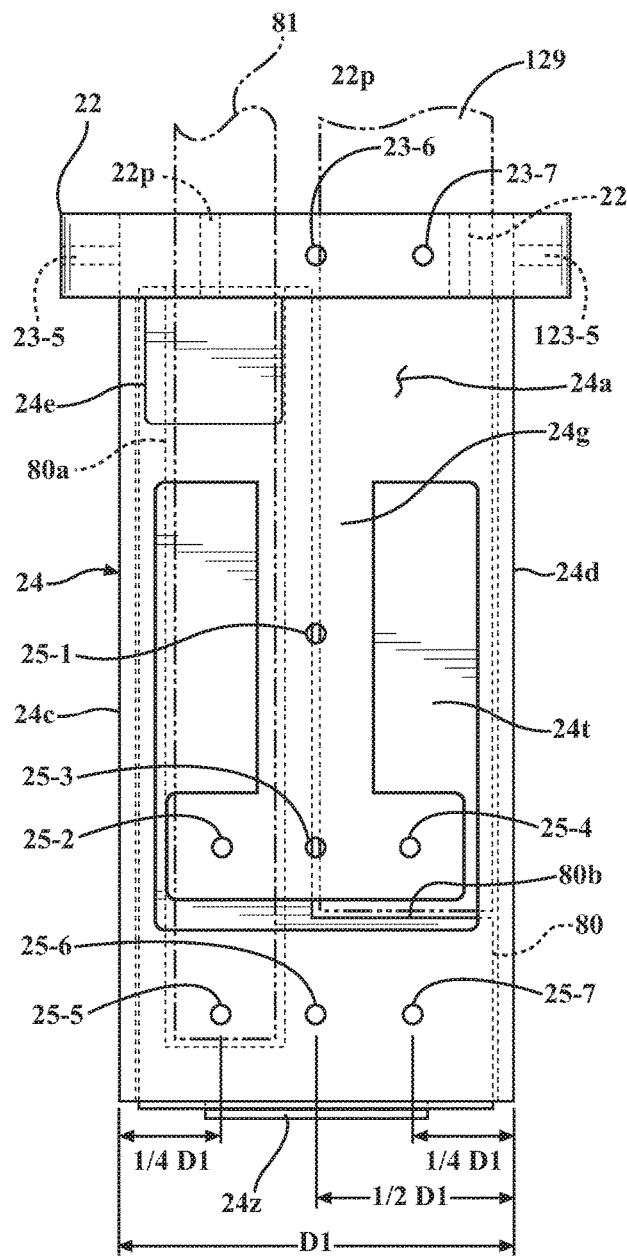
FIG. 5 is a schematic front view of the stake pocket insert shown in FIG. 1, illustrating a hole pattern formed along a side of the stake receptacle structured to face a vehicle cargo bed, and also showing positioning of a stake-positioning insert within the stake receptacle, in accordance with an embodiment described herein.
Figure 7:
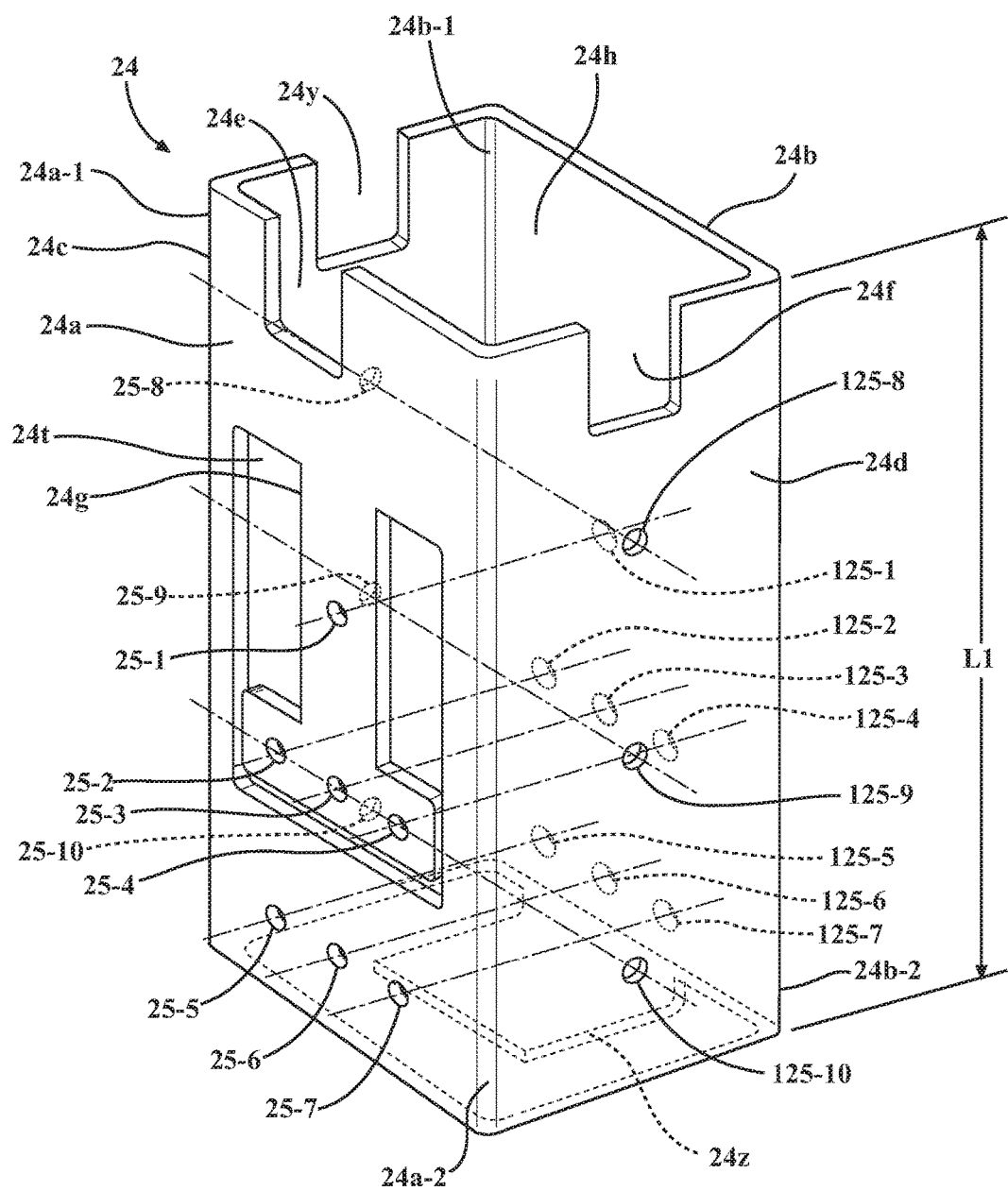
FIG. 7 is a schematic perspective detail view of the stake receptacle shown in FIGS. 1 and 5.

Various embodiments of the stake pocket insert may include (or be structured to accommodate) one or more of several stake securement mechanisms as described herein. In one or more arrangements, the stake securement mechanism is in the form of one or more stake securement members (such as bolts, for example) which may extend from a first side or wall of the stake receptacle 24 to a hole in a side or wall of the stake receptacle opposite the first side, to aid in securing the stake in the receptacle. The securement members may also extend into or pass through portions of the stake residing in the stake receptacle. FIG. 5 is a schematic front view of the stake pocket insert 20 shown in FIG. 1 illustrating a hole pattern formed along a wall 24a of the stake receptacle 24 structured to face a vehicle cargo bed, in accordance with an embodiment described herein. FIG. 7 is a schematic perspective view of the stake receptacle embodiment shown in FIGS. 1 and 5. Referring to FIGS. 5 and 7, the stake receptacle 24 may include a first wall 24a and a second wall 24b extending opposite the first wall 24a. A third wall 24c may extend between and connect the first and second walls along respective first edges 24a-1 and 24b-1 of the first and second stake receptacle walls 24a and 24b. A fourth wall 24d may be positioned opposite the third wall 24c and may extend between and connect the first and second stake receptacle walls 24a and 24b along respective second edges 24a-2 and 24b-2 of the first and second stake receptacle walls 24a and 24b. The stake receptacle walls 24a-24d may be dimensioned so that the stake receptacle 24 will fit into a stake pocket 19 formed in the cargo bed sidewall 18 of a vehicle, for example, a pickup truck. The first, second, third, and fourth walls 24a-24d of the stake receptacle 24 may combine to define a defining a stake-receiving cavity 24h therebetween. The stake-receiving cavity 24h may be structured to receive any of a variety of stakes therein. For example, stake-receiving cavity 24h may be sized to receive a conventional wooden 2×4, or the largest size stake the stake-receiving cavity will accept. The stake receptacle 24 may be formed from any suitable material, for example, a metallic material or a polymer. The stake receptacle 24 may be secured to the mounting member 22 (described below) using welding, an interference fit, and/or any other suitable method.

In one or more arrangements, the stake receptacle 24 may have a length L1 specified so as to extend from the rail 17 all the way down to a floor 23 (FIG. 1) of the cargo bed when the stake pocket insert 20 is positioned and secured in the stake pocket 19. In other arrangements, the stake receptacle 24 may have a length L1 specified so as extend down from the rail 17 to an intermediate location between the rail 17 and the floor 23 of the cargo bed when the stake pocket insert 20 is positioned and secured in the stake pocket 19.

As seen in FIGS. 5 and 7, at least one of stake receptacle walls 24a-24d may have a cam window formed therein. The cam windows may define openings extending from an exterior of the stake pocket insert into the stake-receiving cavity 24h. In the embodiment shown in the drawings, three cam windows 24e, 24y, 24f are formed in stake receptacle walls 24a, 24c, and 24d, respectively. Each cam window may be structured for receiving a portion of an associated cam therein as described below, to permit the portion of the cam to extend into the stake-receiving cavity 24h to contact a stake inserted into the stake-receiving cavity.

Stake receptacle 24 may also include a flexible wall portion 24g formed therein. The flexible wall portion 24g may be formed in a wall (such as stake receptacle wall 24a) structured to face in a direction toward the cargo bed when the stake pocket insert 20 is positioned in the stake pocket 19. Flexible wall portion 24g may be structured to move flexibly with respect to the remainder of the wall in which it is formed, and with respect to the remainder of the stake receptacle 24. In the embodiment shown, a cutout 24t surrounds the flexible portion 24g of the stake receptacle wall 24a and the flexible wall portion 24g extends in cantilevered fashion from the remainder of the wall 24a. Stake receptacle wall 24a containing the flexible wall portion 24g may form a first side of the stake receptacle 24, while stake receptacle wall 24b positioned opposite stake receptacle wall 24a may form a second side of the stake receptacle 24 opposite the first side.

Referring to FIGS. 5 and 7, the stake receptacle first wall 24a may have a plurality of through-holes formed therein, and stake receptacle second wall 24b opposite first wall 24a may have a plurality of through-holes formed therein. In one or more arrangements, each through-hole of the plurality of first wall through holes may be coaxially aligned with an associated through-hole of the plurality of second wall through holes. This arrangement enables a bolt or other stake securement member (not shown) to be inserted into a stake receptacle first wall through hole, across the stake-receiving cavity 24h and into a through-hole formed in the stake receptacle second wall 24b.

A portion of the stake receptacle first wall through-holes may be formed in the flexible wall portion 24g, while a portion of the first wall through holes may be formed in other portions of the stake receptacle first wall 24a. For example, in the embodiment shown, through-holes 25-1, 25-2, 25-3 and 25-4 are formed in the flexible wall portion 24g, while through-holes 25-5, 25-6, and 25-7 are formed in a portion of stake receptacle first wall 24a residing between the flexible wall portion 24g and an end of the stake receptacle 24 which is a lower end of the stake receptacle when the stake pocket insert 20 is positioned in a stake pocket.

The stake receptacle second wall 24b may also include a plurality of second side through holes formed therealong. For example, in FIG. 7, through-holes 125-1 through 125-4 along second wall 24b may be positioned opposite and coaxially with associated ones of flexible wall portion through-holes 25-1 through 25-4, respectively, formed in flexible wall portion 24g. In addition, through-holes 125-5 through 125-7 along receptacle second wall 24b may be positioned opposite and coaxially with through-holes 25-5 through 25-7, respectively, formed in the lower portion of first wall 24a.

Any of stake receptacle second side through holes 125-1 through 125-7 may be threaded so as to engage a complementary bolt or other threaded stake securement member extending from an associated coaxial through-hole in the stake receptacle first wall 24a to the stake receptacle second wall through hole. Alternatively, any of stake receptacle second side through-holes 125-1 through 125-7 may be unthreaded, so as to enable insertion of a stake securement member into an associated through-hole from the stake receptacle first wall 24a, through the stake-receiving cavity 24h, and through an associated through-hole in receptacle second wall 24b. This enables a nut, for example, to be attached to the end of the stake securement member projecting through the stake receptacle second side through-hole.

In addition, for through-holes 25-1 through 25-4 formed in the flexible wall portion 24g, a stake securement member (not shown) may be inserted into one of the flexible wall portion through-holes 25-1 through 25-4, through the stake-receiving cavity 24h and into an associated coaxial through-hole on the stake receptacle second wall 24b. This stake securement member may then be tightened (by rotation in an associated nut or threaded portion of the second side through hole) so as to cause the flexible wall portion 24g to resiliently deflect toward the stake receptacle second wall 24b. This may enable a stake or a stake-positioning insert 80 (described below) positioned in the stake-receiving cavity 24h to be gripped more tightly between the opposite stake receptacle walls 24a and 24b, increasing the retention force on the stake or stake receptacle insert 80.

Also, after a stake or a stake-positioning insert 80 has been positioned as desired within the stake receiving cavity 24h, any of the through-holes located along the stake receptacle first wall 24a may serve as a pilot hole for the drilling of one or more holes into or through the stake or the stake-positioning insert 80. Stake securement members (such as bolts, for example) may then be inserted into any of the first wall through-holes 25-1 through 25-7, then through or into the holes drilled into the stake or the stake-positioning insert 80, to aid in securing the stake or the stake-positioning insert 80 within the stake-receiving cavity 24h.

In the embodiments described herein, the flexible wall portion is "T"-shaped as shown in FIGS. 5 and 7, which provides a degree of flexibility in securing a stake or a stake-positioning insert 80 within the stake-receiving cavity 24h. However, the flexible wall portion may have any of a variety of alternative shapes suitable for any particular application.

Referring to FIG. 5, in one or more arrangements, holes 25-2 through 25-7 may be evenly spaced along a width dimension D1 of the stake receptacle 24. for example, holes 25-2 and 25-5 may be spaced a distance ¼ D1 from receptacle wall 24c, holes 25-4 and 25-7 may be spaced a distance ¼ D1 from receptacle wall 24d, and holes 25-3 and 25-6 may be spaced a distance ½ D1 from both of walls 24c and 24d. Other hole spacing arrangements are also possible, depending on the requirements of a particular application.

Figure 5A:
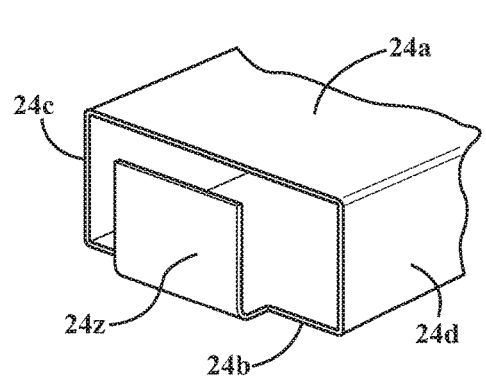
FIG. 5A is a schematic partial perspective view of a portion of the stake receptacle shown in FIG. 5, showing an embodiment of a flap extending from a bottom portion of a wall of the stake receptacle.

Referring to FIGS. 5 and 5A, one or more of stake receptacle walls 24a-24d may include a fold or flap 24z formed along an edge structured to reside closest to the floor of the cargo bed when the stake pocket insert 20 is positioned and secured in the stake pocket 19. FIG. 5A is a schematic partial perspective view of a portion of the stake receptacle 24 shown in FIG. 5, showing an embodiment of the flap 24z extending from a wall 24b of the stake receptacle 24. Flap 24z may be structured to serve as a bottom hard stop for controlling an insertion depth of a stake or stake-positioning insert 80 into the stake-receiving cavity 24h.

Figure 6:
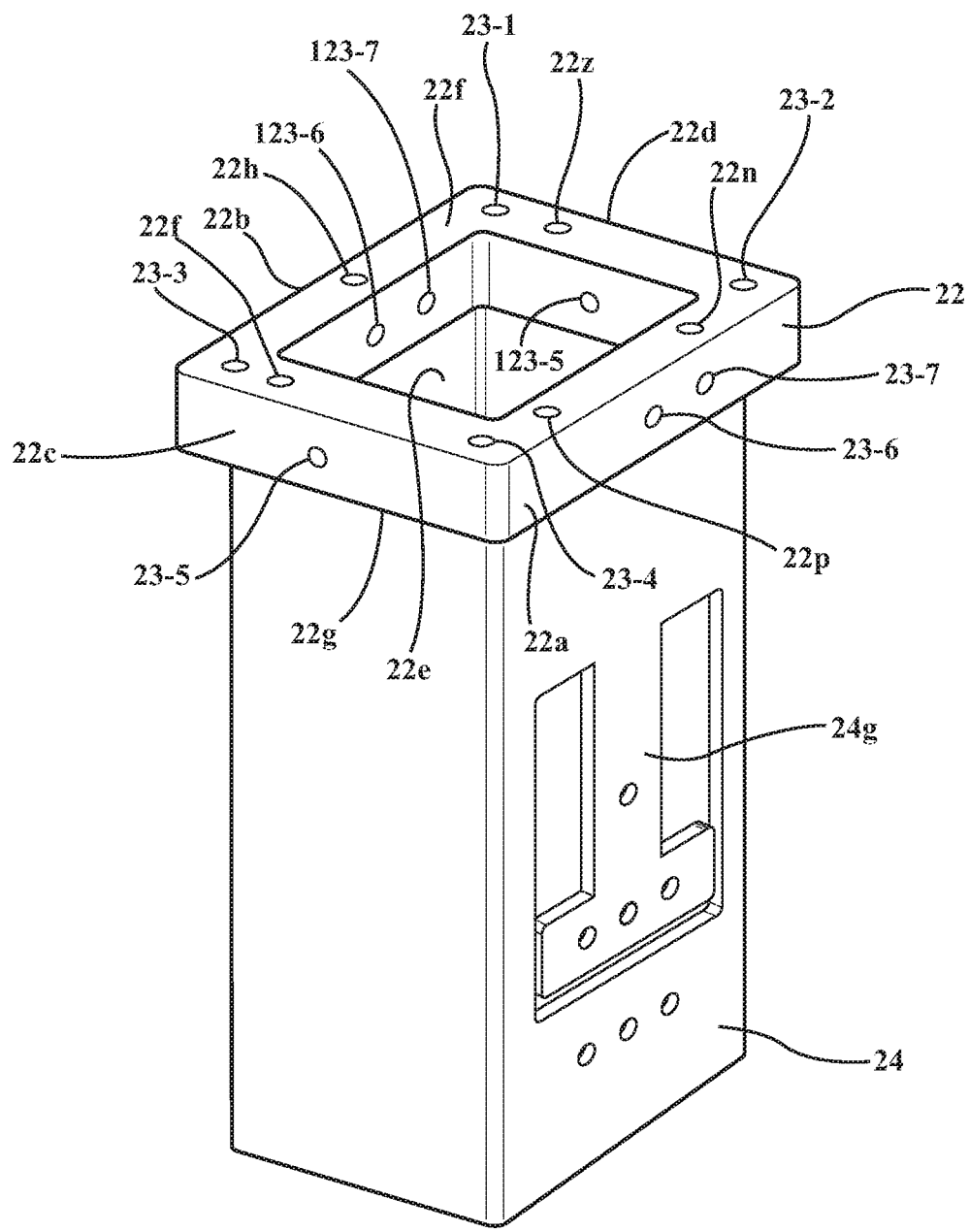
FIG. 6 is a schematic perspective detail view of the mounting member shown in FIGS. 1 and 5.

Referring to FIG. 6, mounting member 22 may have a plurality of intersecting walls 22a, 22b, 22c, and 22d arranged to form an opening 22e leading from an exterior of the stake pocket insert 20 into the stake-receiving cavity 24h, and structured for receiving a stake or post therethrough. Similarly-facing surfaces of mounting member walls 22a, 22b, 22c, and 22d may combine to form a first face 22f of the mounting member. Other similarly-facing surfaces of mounting member walls 22a, 22b, 22c, and 22d may combine to form a second face 22g of the mounting member residing opposite the mounting member first face 22f. Stake securement cams 92, 94, 96 (described below) and clamps 91 and 93 (also described below) are not shown in FIG. 6, in order to focus the description on mounting member 22. It will be understood, however, that the clamps 91 and 93 and one or more of cams 92, 94, 96 may be included in any embodiment described herein.

Mounting member first face 22f may be structured to face upwardly when the stake pocket insert 20 is installed in the cargo bed sidewall 18. Mounting member second face 22g may be structured to rest and bear against the rail first or upper surface 17a when the stake pocket insert 20 is installed in the cargo bed sidewall. Each of mounting member walls 22a, 22b, 22c, and 22d may also have an inner face facing into the opening 22e, and an associated outer face positioned and facing in a direction opposite the inner face. Each of the mounting member wall inner and outer faces may extend between the mounting member first face 22f and the mounting member second face 22g. Also, in one or more embodiments described herein, the mounting member 22 and the stake receptacle may be designed and secured with respect to each other such that inner faces of the mounting member walls 22a-22d and inner surfaces of associated stake receptacle walls 24a-24d are coplanar or substantially coplanar when the stake receptacle 24 is attached to the mounting member 22. This arrangement may provide an enclosure having relatively smooth, well-defined walls for receiving a stake into the stake pocket insert.

The mounting member 22 may also have one or more stake securement through-holes formed therein. Each stake securement through-hole may be structured to enable a stake securement element to be inserted through the hole and into contact with (or through) a stake (not shown) residing in the stake-receiving cavity 24h, to aid in securing the stake within the stake receptacle 24. For example, in the embodiment shown in the drawings and particularly in FIG. 6, mounting member 22 has a stake securement through-hole 23-5 extending between the inner and outer faces of mounting member wall 22c, and an associated stake securement through-hole 123-5 extending between the inner and outer faces of mounting member wall 22d and coaxially with stake securement through-hole 23-5. Mounting member 22 also has a stake securement through-hole 23-6 extending between the inner and outer faces of mounting member wall 22a, and an associated stake securement through-hole 123-6 extending between the inner and outer faces of mounting member wall 22b and coaxially with stake securement through-hole 23-6. Mounting member 22 also has a stake securement through-hole 23-7 extending between the inner and outer faces of mounting member wall 22a, and an associated stake securement through-hole 123-7 extending between the inner and outer faces of mounting member wall 22b and coaxially with stake securement through-hole 23-7.

Any of mounting member stake securement through-holes 123-5 through 123-7 may be threaded so as to engage a complementary bolt or other threaded securement member inserted into and extending from an associated coaxial one of through-holes 23-5 through 23-7. Alternatively, any of mounting member stake securement through holes 123-5 through 123-7 may be unthreaded, so as to enable insertion of a securement member into one of through-holes 123-5 through 123-7 from an associated coaxial one of through-holes 23-5 through 23-7. This enables a nut, for example, to be attached to the end of the securement member projecting through an end of one or more of the mounting member stake securement through holes 123-5 through 123-7.

The mounting member 22 may also have one or more stake pocket insert securement through-holes formed therein. Each of the stake pocket insert securement through-holes may be structured to receive therein a fastener (such as a bolt, for example) structured to engage an associated, complementary hole formed in the cargo bed sidewall 18, so as to aid in securing the mounting member 22 to the cargo bed side wall 18. For example, in the embodiment shown in FIGS. 1 and 6 the mounting member 22 has stake pocket insert securement through-holes 23-1, 23-2, 23-3, and 23-4 extending between mounting member first face 22f and mounting member second face 22g of the mounting member 22. Bolts or other securement members (not shown) may be inserted into stake pocket insert securement through-holes 23-1, 23-2, 23-3, and 23-4 along mounting member first face 22f and through the mounting member 22 to exit the stake pocket insert securement through-holes 23-1, 23-2, 23-3, and 23-4 along mounting member second face 22g, where the securement members may be inserted into threaded or non-threaded holes (not shown) provided in rail 17. These securement members may secure the mounting member 22 to the rail 17 in addition to (or as an alternative to) clamps 91 and 93 described elsewhere herein. The various through-holes formed in mounting member 22 may be located so as to avoid mutual interference between any bolts or other securement members inserted into the holes.

Figure 4B:
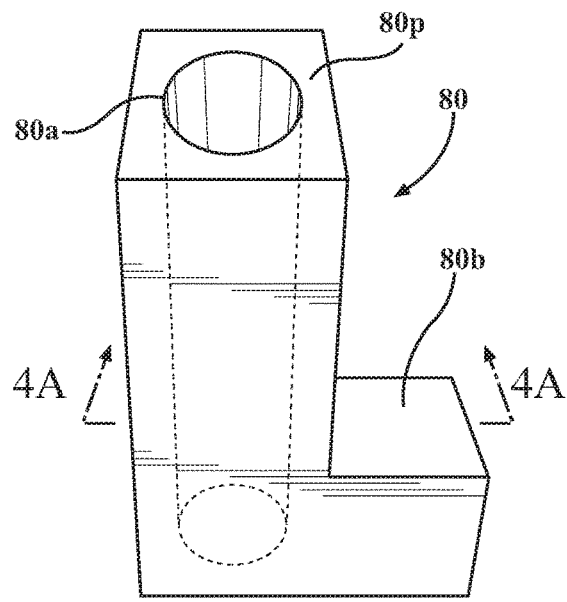
FIG. 4B is a schematic perspective view of the stake receptacle insert shown in FIG. 4A.
Figure 4A:
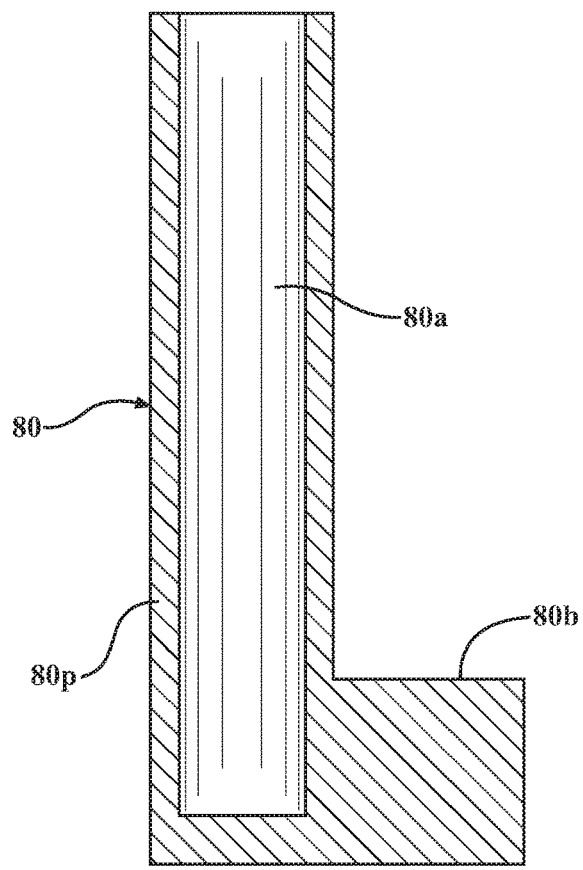
FIG. 4A is a schematic cross-sectional side view of a stake receptacle insert in accordance with an embodiment described herein.

Referring to FIGS. 4A-5, an optional stake-positioning insert 80 may be inserted within the stake-receiving cavity 24h to enable various alternative sizes and shapes of stakes to be inserted and secured in the stake receptacle 24. The stake-positioning insert 80 may be structured to position a stake inserted into the stake receptacle 24. The stake may have a size and/or shape different from a size and/or shape of a stake which the stake-receiving cavity 24h is structured to receive without the stake-positioning insert 80 positioned in the stake-receiving cavity 24h.

FIG. 4A is a schematic side cross-sectional view of an embodiment of the stake-positioning insert 80. In one or more arrangements, stake-positioning insert 80 is generally "L"-shaped and sized so as to be insertable into the stake-receiving cavity 24h in a close sliding fit. Stake-positioning insert 80 may include a first portion 80p defining a cavity 80a structured to receive a stake in the form of a piece of pipe 81 therein (shown in phantom in FIG. 5).

In addition, the stake-positioning insert 80 may be structured so that insertion of the stake-positioning insert 80 into the stake-receiving cavity 24h defines at least one region exterior of the stake-positioning insert 80 and within the stake-receiving cavity 24h which is structured to receive a stake therein. For example, as seen in FIGS. 4A-5, a shelf 80b may extend from first portion 80p to serve as a platform on which a rectangular stake 129 (such as a standard 1×2)(shown in phantom in FIG. 5) may rest when inserted into the stake-receiving cavity 24h.

FIG. 5 also shows an arrangement of the features of stake-positioning insert 80 (shown in phantom) with respect to the holes formed in receptacle flexible wall portion 24g. For example, a bolt inserted into flexible wall portion through-hole 25-4 and extending through to an associated hole in opposite wall 24b of the stake receptacle 24 may be used to secure the stake-positioning insert 80 within the stake-receiving cavity, by deflecting the flexible wall portion 24g into intimate contact with the stake-positioning insert 80. Also, bolts or screws inserted into any of through-holes 25-5, 25-6, and 25-7 may extend into the material forming the stake-positioning insert 80, thereby securing the stake-positioning insert 80 within the stake-receiving cavity 24h. Stake-positioning insert 80 may be inserted or removed from the stake-receiving cavity 24h as desired. Stake-positioning insert 80 may be formed from any suitable material, such as a polymer.

Figure 3A:
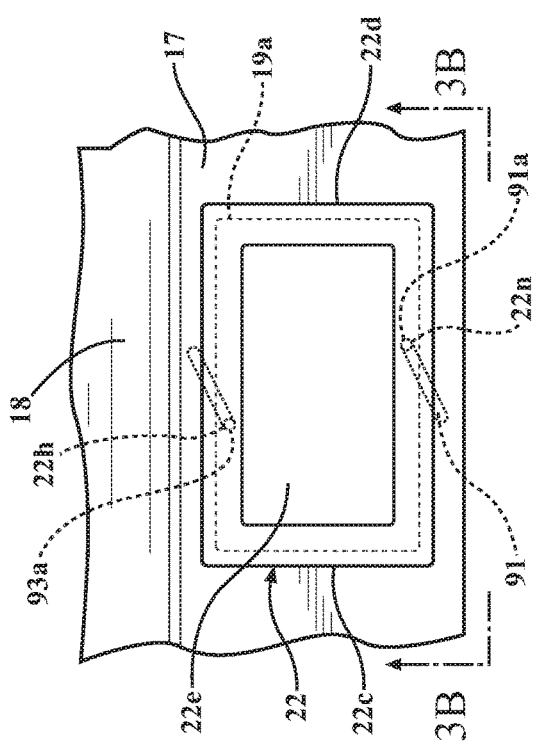
FIG. 3A is the schematic plan view of FIG. 2A showing the stake pocket insert securement clamps rotated to an orientation suitable for contacting surfaces of the cargo bed sidewall adjacent the stake pocket, to secure the stake pocket insert to the sidewall.
Figure 3B:
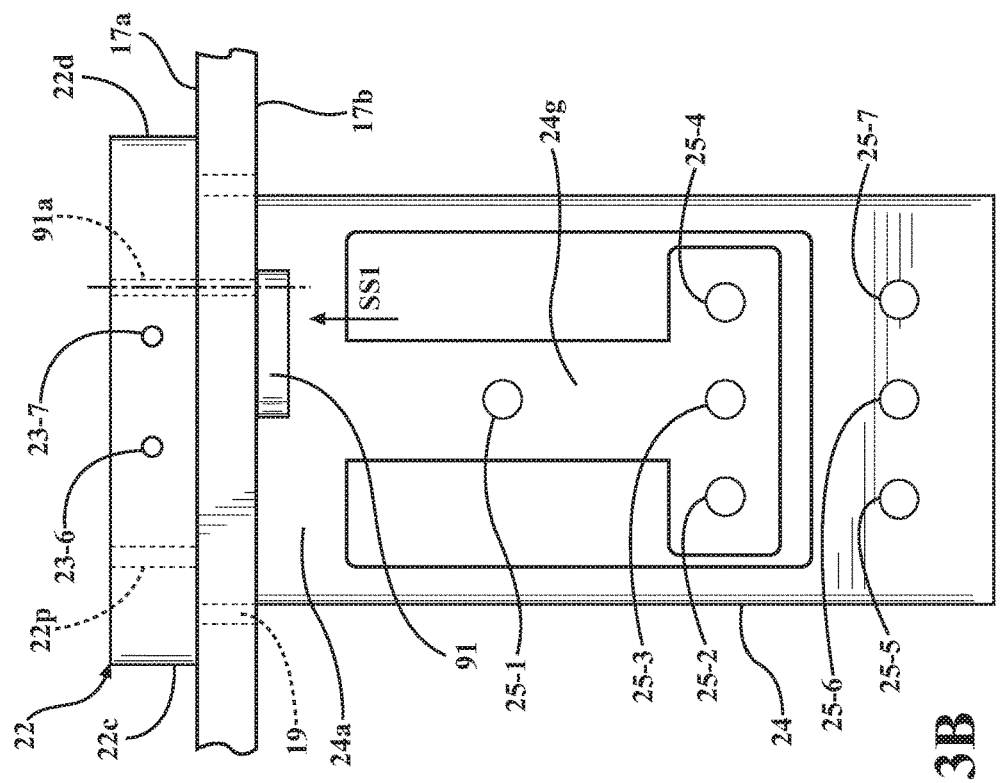
FIG. 3B is a schematic side view of the arrangement shown in FIG. 3A, with the stake pocket insert securement clamps bearing against the cargo bed sidewall after tightening of the threaded members of the clamps to bring the clamps into contact with associated surfaces of the cargo bed sidewall.

Referring to the drawings, and in particular to FIGS. 2A-3B, various stake pocket insert securement mechanisms may be provided to secure the stake pocket insert 20 to the vehicle cargo bed sidewall 18. For example, stake pocket insert securement through-holes formed in mounting member 22 were described above. In another aspect, at least a first clamp 91 and a second clamp 93 may be rotatably mounted to the mounting member 22 along mounting member second face 22g. FIGS. 2A-3B illustrate operation of stake pocket insert securement clamps 91 and 93. In FIGS. 2B and 3B, cams 92, 94, 96 and cam windows 24y, 24e, 24f described elsewhere herein have been omitted so that the following portion of the description may be focused on the clamps 91 and 93.

FIG. 2A is a schematic plan view of a stake pocket insert in accordance with an embodiment described herein positioned in a stake pocket and with associated stake pocket insert securement clamps 91 and 93 positioned in orientations suitable for insertion into the stake pocket 19. FIG. 2B is a schematic side view of the stake pocket insert arrangement shown in FIG. 2A. As seen in FIG. 2A, first clamp 91 may be mounted to the mounting member 22 so as to be positioned along a first side of the stake pocket 19 proximate stake receptacle first wall 24a, and the second clamp 93 may be mounted to the mounting member 22 so as to be positioned along a second side of the stake pocket 19 opposite the first side and proximate stake receptacle second wall 24b. Each clamp resides adjacent an associated receptacle wall and outside the receptacle stake-receiving cavity 24h. Each clamp may be structured and mounted to the mounting member 22 using an associated threaded member (such as a screw or bolt) which may be positioned in an associated through-hole extending between the mounting member first face 22f and mounting member second face 22g. In the embodiment shown, clamp 91 is rotatably secured to the mounting member 22 by a threaded member 91a extending through a hole 22n (FIG. 6) formed in the mounting member 22. Similarly, clamp 93 is rotatably secured to the mounting member 22 by a threaded member 93a extending through a hole 22h (FIG. 6) formed in the mounting member. The threaded members may be accessed for rotation by a tool along the mounting member first face 22f.

FIG. 2A shows the mounting member 22 resting on an associated sidewall rail 17, with clamps 91 and 93 rotatably attached to the mounting member 22 and oriented for insertion of the stake pocket insert 20 into the stake pocket 19 along surface 17a. FIG. 2B shows clamp 91 after insertion into the stake pocket 19 and positioning below sidewall second surface 17b. For insertion of the stake pocket insert 20 into stake pocket 19, clamps 91 and 93 may be rotated to the orientations shown in FIG. 2A, extending generally parallel with an adjacent stake receptacle sidewall. The stake pocket insert 20 may then be inserted into the stake pocket 19 with the clamps 91 and 93 dropping into the stake pocket 19 and past the second surface 17b of the sidewall to an exterior of the stake pocket 19.

FIG. 3A is the schematic plan view of FIG. 2A showing clamps 91 and 93 rotated to an orientation suitable for contacting surfaces of the cargo bed sidewall adjacent the stake pocket, to secure the stake pocket insert to the sidewall. The clamps may be rotated to the orientations shown prior to or during rotation of their associated threaded members 91a and 93a to move the clamps 91 and 93 toward the sidewall second surface 17b, as described herein. Referring to FIG. 3A, each of clamps 91, 93 may also be rotatable in a respective rotation direction to position a portion of the clamp directly opposite the second surface 17b of the cargo bed sidewall 18 after the stake pocket insert 20 is inserted into the stake pocket 19. As seen in FIG. 3A, the clamps 91 and 93 may be rotated about their respective threaded members 91a and 93a so that ends of the clamps positioned farthest from the threaded members 91a and 93a move underneath the cargo bed sidewall 18, opposite the second surface 17b of the cargo bed sidewall 18. FIG. 3B is the schematic side view of the arrangement shown in FIG. 3A showing movement of the clamp 91 into contact with sidewall second surface 17b to secure the stake pocket insert 20 to the cargo bed sidewall 18, as described below.

In addition, each clamp may be rotatable in its respective rotation direction to position the clamp in contact with at least one of the stake receptacle 24 and the mounting member 22, thereby preventing further rotation of the clamp in the respective rotation direction. Thus, for example, as seen in FIG. 3A, each clamp may be rotated until an end of the clamp closest to its associated threaded member abuts the stake receptacle 24. This prevents further rotation of the clamp in the rotation direction. Instead of rotating the clamp into abutment with the stake receptacle 24, the clamp may be rotated so as to abut a feature such as a projection (not shown) extending from the mounting member.

Referring to FIGS. 2B and 3B, when rotation of a clamp is prevented by contact with the stake receptacle 24 or the mounting member 22, rotation of the associated threaded member securing the clamp to the mounting member will act to move the clamp in direction SS1, reducing a distance between the clamp and the mounting member 22 until the mounting member is abutting the first surface 17a of the rail 17 on the cargo bed sidewall 18 and the clamp abuts the second surface 17b of the rail 17. Because the clamp is prevented from rotating, rotation of the threaded member extending through the clamp may cause the clamp to advance along the threaded member toward the rail 17, until the clamp contacts the rail. The opposite end of the threaded member (including a bolt or screw head, for example) also bears against a surface of the mounting member 22 during rotation of the threaded member. Further rotation of the threaded member will tighten the clamp against the rail 17. The threaded member may be rotated until the associated clamp bears firmly against the sidewall second surface 17b, thereby securing the mounting member 22 to the cargo bed sidewall 18.

Figure 12:
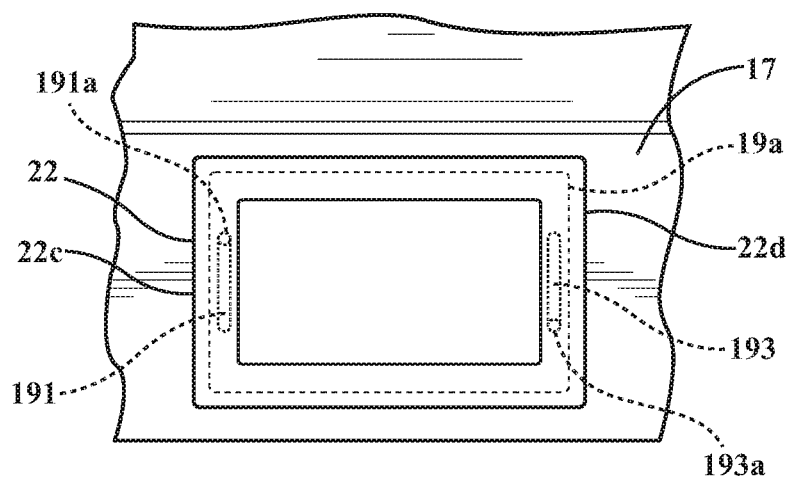
FIG. 12 is a schematic plan view of a stake pocket insert in accordance with another embodiment described herein, shown positioned in a stake pocket and with associated stake pocket insert securement clamps positioned in an orientation suitable for insertion into the stake pocket.

Rotation of a clamp to contact with the stake receptacle 24 or mounting member 22 may be done by a user moving the clamp into contact with the stake receptacle 24 or mounting member 22 by hand, or the clamp may be rotated by turning the associated threaded member, thereby causing the clamp to rotate until a portion of the clamp abuts one of the stake receptacle 24 or the mounting member 22, at which point further rotation of the clamp will be prevented. Alternatively, the user may hold the clamp to prevent rotation during actuation of the threaded member. In an alternative arrangement, as seen in FIG. 12, clamps 91 and 93 may be attached to the mounting member 22 adjacent walls 24c and 24d of the stake receptacle 24, and may operate in the same manner as described above.

Referring to FIGS. 8A-9B and 10-11C, in one or more arrangements, the stake securement mechanism is in the form of one or more cams rotatably secured to the mounting member as described herein, so as to enable the cams to be rotated to press against a stake positioned in the stake receptacle. Each cam may be operable to bias the stake against a bearing surface positioned on a side of the stake opposite the cam, to aid in securing the stake within the stake receptacle between the cam and the bearing surface.

In one or more arrangements, one or more cams may be rotatably mounted to the mounting member 22 such that a portion of each cam is extendable into the stake-receiving cavity 24h through an associated one of cam windows 24e, 24y, 24f formed in stake receptacle 24 as previously described. The cam(s) may also be rotatably mounted to the mounting member 22 such that the cams are insertable into the stake pocket 19 and through the stake pocket 19 during insertion of the stake pocket insert 20 into the stake pocket opening 19. FIGS. 8A-9B and 10-11C show an embodiment including three cams 92, 94 and 96. Alternatively, only one cam or two cams may be used, depending on the needs of a particular design or application.

General characteristics of the cams will be described with reference to FIGS. 8A-9B and 11-11C, with a cam 94 used as a representative example. In one or more arrangements, and in the embodiment shown in the drawings, the cams 92 and 96 may have the same geometries and characteristics set forth in the following description of cam 94. For example, cam 94 has a radius 94r of a peripheral surface 94c of the cam 94, while cam 92 has a radius 92r of a peripheral surface 92c of the cam 92. Alternatively, the cams may have different geometries, according to the requirements of a particular application.

Referring to FIGS. 8A-9B and 11-11C, cams 92, 94 and 96 may be mounted to the mounting member 22 so as to reside adjacent mounting member second face 22g. Referring to cam 94 in FIG. 11, each cam may have a hole (such as hole 94a) through which an associated mounting pin or shaft 94b may be inserted, for rotatably attaching the cam to the mounting member 22. Similarly, a pin or shaft 92b may rotatably attach the cam 92 to the mounting member 22 through a hole 92a formed in cam 92, and a pin or shaft 96b may rotatably attach the cam 96 to the mounting member 22 through a hole 96a formed in cam 96. A tool-receiving cavity for an Allen wrench, knob, or other rotational tool may be formed in an end of the shaft 94b and may be structured to be accessible from mounting member first face 22f. The cam 94 may be rotated by inserting a tool into the end of the mounting shaft and rotating the shaft.

Cam 94 may have a peripheral surface 94c defining a working surface of the cam (i.e., peripheral surface 94c may be structured for contacting a stake inserted into the stake receiving cavity 24h when the cam 94 is rotated). The peripheral surface 94c may have a radius 94r which may vary along the peripheral surface 94c. In addition, cam 94 may be structured so that a radius 94r of the peripheral surface 94c increases along a first rotation direction DD1 of the cam, from a first angular location 94-1 along the peripheral surface 94c to a second angular location 94-2 along the peripheral surface 94c. In one or more arrangements, the radius 94r may reach a minimum value at first angular location 94-1 and a maximum value at second angular location 94-2.

Figure 11:
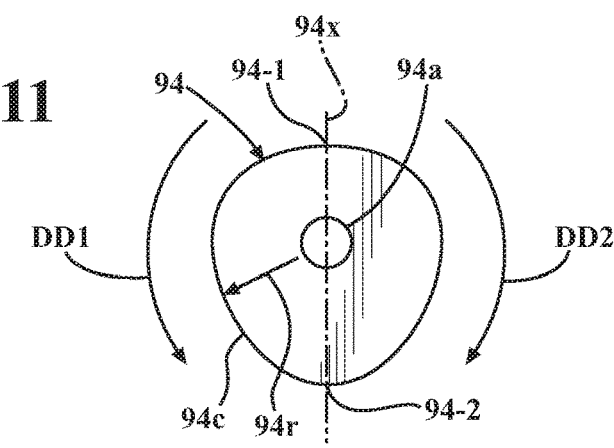
FIG. 11 is schematic a plan view of a configuration of a cam in accordance with an embodiment described herein.

In one or more arrangements, and as shown in FIG. 11, cam 94 may be structured so that the radius 94r of the peripheral surface 94c of the cam also increases along a second rotation direction DD2 of the cam, from the first angular location 94-1 along the peripheral surface 94c to the second angular location 94-2 along the peripheral surface 94c. In such arrangements, the cam(s) may be rotated in either of the first or second rotation directions DD1 or DD2 to engage the stake positioned in the stake receiving cavity 24h. Varying the cam radius along the peripheral surface 94c enables the cam to engage the stake over a range of clearances or spacings between the stake and the stake receptacle wall along which the cam is mounted.

In other arrangements, the cams may have different geometries (for example, the rate of increase of the radius 94r of the cam peripheral surface may vary among the cams incorporated into a single stake pocket insert). Also, referring to FIG. 9A, a height dimension H1 of one or more of cams 92, 94, 96 may be increased to provide additional bearing surface area between the cam and a stake inserted into stake-receiving cavity 24h. This may increase the stability of the stake within the stake-receiving cavity when the cam bears against the stake.

The radius of the peripheral surface of a cam may increase uniformly in a given rotation direction. For example, the radius may increase a certain amount (for example, in millimeters) for each angular increment (for example, 5°) traversed along the peripheral surface in the rotation direction. Alternatively, the rate of increase of the radius may be non-uniform.

Figure 9A:
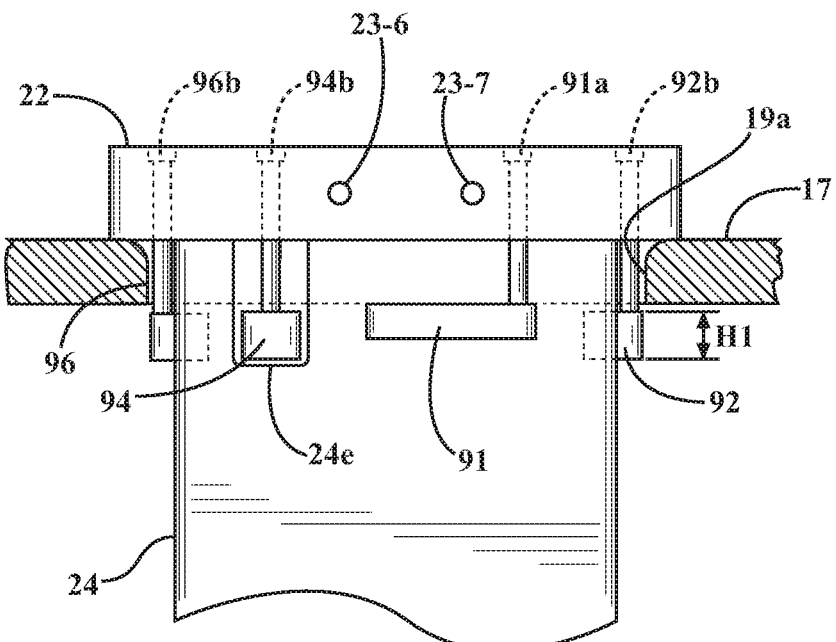
FIG. 9A is a schematic side cross-sectional view showing an embodiment of the stake pocket insert in which the cams may reside below a stake pocket when the stake pocket insert is inserted into the stake pocket.
Figure 9B:
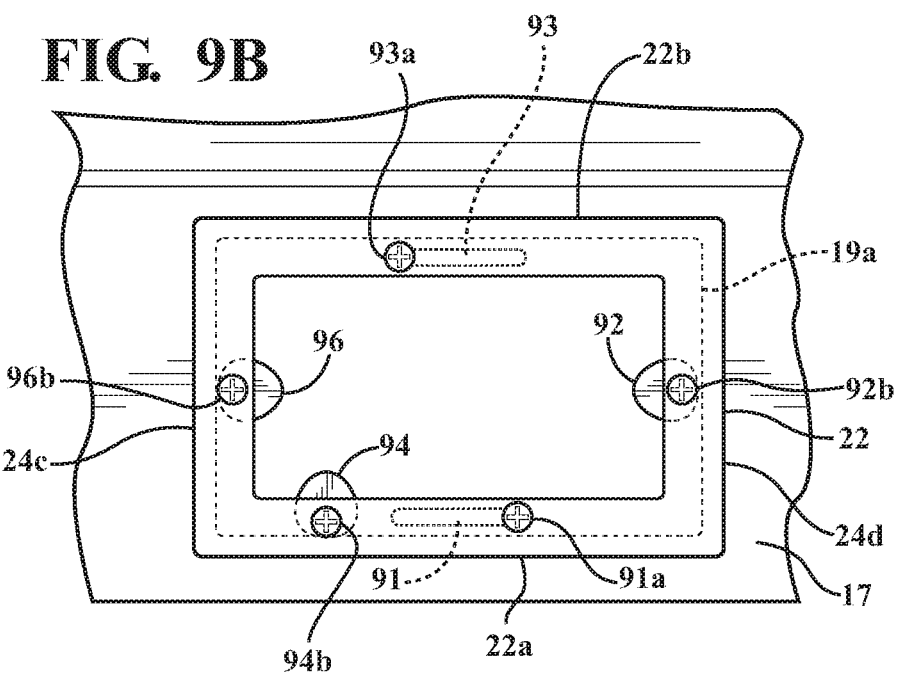
FIG. 9B is a schematic plan view of the stake pocket insert in FIG. 9A, showing an arrangement of cams and clamps oriented to facilitate insertion of the stake pocket insert into a stake pocket in a vehicle sidewall.
Figure 11A:
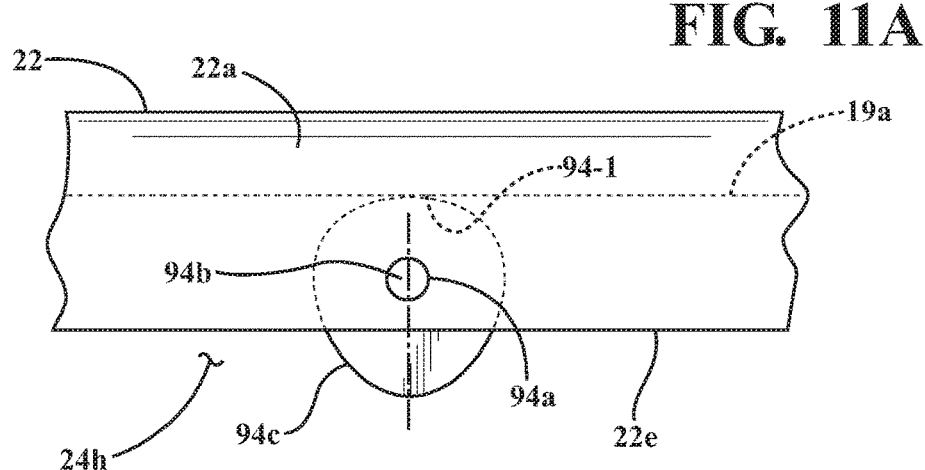
FIG. 11A is a schematic plan view of a cam in accordance with FIG. 11, rotatably attached to a mounting member and showing the cam rotated so as to extend through a stake receptacle cam window into a stake-receiving cavity.
Figure 11B:
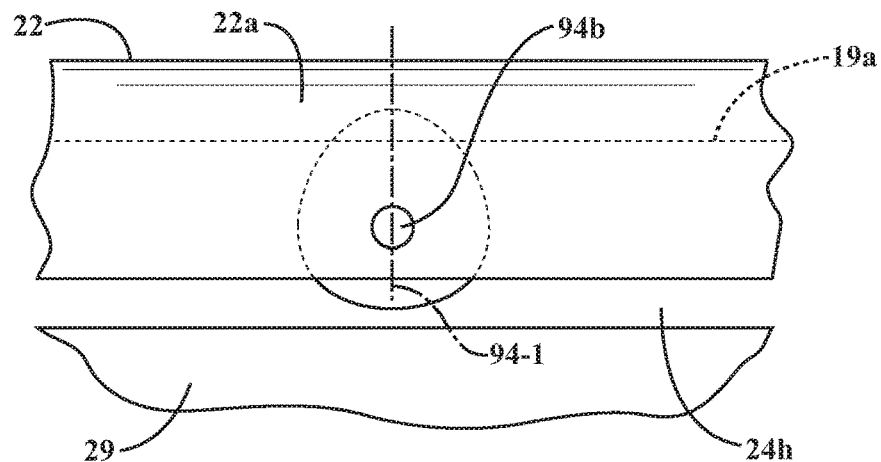
FIG. 11B a schematic plan view of a cam in accordance with FIG. 11, showing the cam rotated so as to extend out of a stake-receiving cavity during insertion of a stake into the stake-receiving cavity.
Figure 11C:
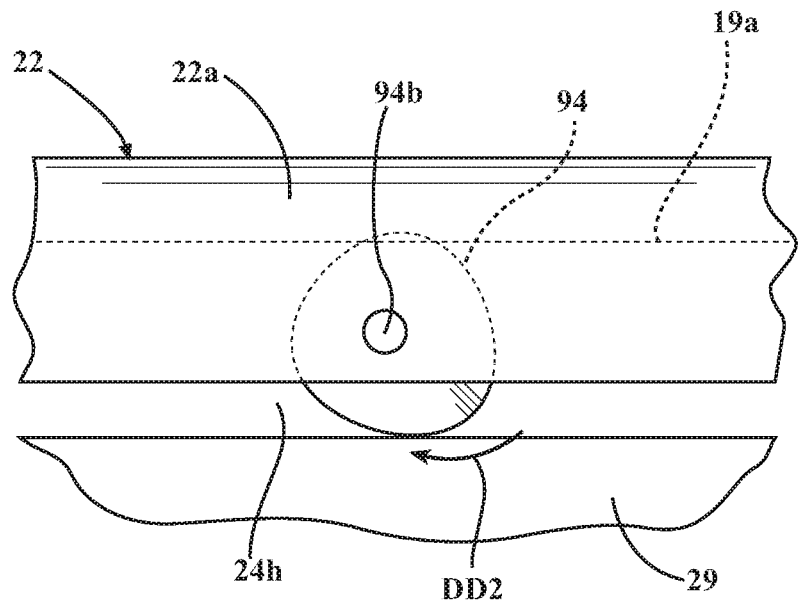
FIG. 11C a schematic plan view of a cam in accordance with FIG. 11, showing rotation of the cam to contact a stake after insertion of the stake into the stake-receiving cavity.

FIGS. 11A-11C show representative rotation of the cams in an arrangement as seen in FIGS. 9A-9B, where the cams reside below the rail 17 after insertion into the stake pocket 19. As seen in FIG. 11A, each cam may be dimensioned and rotatably attached to the mounting member 22 so as to permit the cam to be rotated such that at least a portion of the cam may extend through an associated cam window and into the stake-receiving cavity, so that the portion of the cam peripheral surface (94c in FIG. 11A) having the smallest cam radius may just touch or may be spaced apart from the edge 19A of the stake pocket 19. This may facilitate insertion of the cam into the stake pocket 19 when the stake receptacle 24 is inserted into the stake pocket 19.

Also, as seen in FIG. 11B, each cam may be dimensioned and rotatably attached to the mounting member 22 so as to permit the cam to be rotated out of the stake-receiving cavity 24h during insertion of the stake 29 therein, so as not to interfere with stake insertion. For example, FIG. 11B shows cam 94 rotated so that the smallest cam radius is positioned opposite the stake-receiving cavity 24h, to help remove the cam from an insertion path of the stake 29 into the stake-receiving cavity.

FIG. 11C illustrates rotation of the cam 94 after insertion of the stake 29 into the stake-receiving cavity 24h. The cam 94 may be rotated in a direction DD2 of increasing radius of peripheral surface 94c until the cam 94 contacts and presses against the stake 29.

FIG. 8A is a schematic partial side cross-sectional view of an embodiment of the stake pocket insert 120 in which the cams may reside at least partially within the stake pocket when the stake pocket insert is inserted into the stake pocket. FIG. 8B is a plan schematic view of the arrangement shown in FIG. 8A. In this embodiment, the stake pocket 19 dimensions may be sufficiently large to permit to cams 94, 96, and 92 to rotate freely in all directions when the cams reside in the stake pocket, without interference from the sides of the stake pocket 19. The cams 94, 96, and 92 may extend into the stake-receiving cavity 24h through respective ones of the cam windows 24e, 24y, and 24f formed in the walls of the stake receptacle. This arrangement permits the cam attachment shafts or pins to be relatively shorter, and also enables the stake receptacle cam windows 24e, 24y, and 24f to be made relatively smaller. In addition, the cams 94, 96, and 92 may reside above the clamps 91 and 93, which may ease the burden of coordinating the attachment positions of the clamps and the cams in the mounting member.

FIG. 9A is a schematic partial side cross-sectional view of an embodiment of the stake pocket insert in which the cams may reside below the stake pocket 19 when the stake pocket insert is inserted into the stake pocket. FIG. 9B is a schematic plan view of the stake pocket insert in FIG. 9A, showing an arrangement of cams and clamps oriented to facilitate insertion of the stake pocket insert into a stake pocket in a vehicle sidewall. In this embodiment, the stake pocket 19 may not be sufficiently large to permit to cams 94, 96, and 92 to rotate freely in all directions when the cams reside inside the stake pocket 19. Thus, to rotate freely as needed to contact a stake received within the stake-receiving cavity 24h, the cams 94, 96, and 92 may need to be mounted to the mounting member 22 so that the cams will reside below the rail 17 when the stake pocket insert is mounted to the rail. In addition, the cam attachment locations may be coordinated with the clamp attachment locations in the mounting member 22 as shown in FIG. 9B so that the clamps 91, 93 may rotate freely as described herein to secure the mounting member 22 to an associated sidewall rail 17.

Each of cams 92, 94, 96 may be structured to be rotatable to exert an associated biasing force on a stake residing within an associated stake-receiving cavity 24h. These biasing forces may tend to bias the stake against an associated wall of the stake receptacle positioned opposite the wall along which the cam is positioned, and/or against a wall of the mounting member positioned along a side of the stake pocket insert opposite the side on which the cam is positioned. FIG. 10 is a schematic plan view of a vehicle cargo bed showing stake pocket inserts 20 and 120 positioned in respective stake pockets in rails 17L and 17R along opposite sidewalls 18L and 18R of the cargo bed. Referring to FIG. 10, in one example, the cam biasing forces may be applied by positioning a stake against a desired wall or corner of the stake-receiving cavity and/or mounting member 22, and then rotating the appropriate cams in appropriate rotational directions to apply biasing forces needed to maintain the stake in the desired position within the stake-receiving cavity. For example, in FIG. 10, a stake 29 may be biased against stake receptacle walls 24b and 24c, effectively biasing the stake 29 into a corner 24w formed by the intersection of stake receptacle walls 24b and 24c. Cam 94 may then be rotated in a direction in which the radius of its peripheral surface 94c increases in a direction toward the stake 29, to exert a force on the stake 29 directed to keeping the stake 29 pressed against stake receptacle wall 24b. Cam 92 may also be rotated in a direction in which the radius of its peripheral surface 92c increases in a direction toward the stake 29, to exert a force on the stake 29 directed to keeping the stake 29 pressed against stake receptacle wall 24c.

Each cam extends into the stake-receiving cavity through an associated one of the cam windows 24y, 24e, 24f. As a cam is rotated such that the radius of its peripheral surface increases in a direction toward the stake 29, the cam peripheral surface moves closer and closer to the stake 29, until the peripheral surface contacts the stake. Further rotation of the cam toward an even larger-radius of the peripheral surface increases the contact force pressing the stake 29 against an associated opposite wall of the stake receptacle 24. The cams may be formed from a rubber or other resiliently-deformable elastic material so that the cam material may be compressed slightly in forcing the stake against the opposite wall.

In addition, the stake 29 may be secured in a desired location within the stake-receiving cavity 24h by rotation of the cams such that movement of the stake 29 out of the desired location will tend to rotate the cams in respective directions which resist the movement of the stake 29. For example, as seen in FIG. 10, the peripheral surface radius 92r of cam 92 facing the stake 29 may increase as it is rotated in direction DD1. Thus, rotation of the cam 92 in direction DD1 may tend to urge stake 29 against stake receptacle wall 24c (or maintain stake 29 abutting stake receptacle wall 24c). Movement of the stake 29 out of the corner 24w in direction DD3 will then tend to rotate the cam 92 further in the direction DD1 of increasing peripheral surface radius of the cam, thereby further tightening the compression between the cam 92 and the stake 29. Thus, the cam 92 will tend to resist the movement of the stake 29 out of the corner 24w in direction DD3. Also, as seen in FIG. 10, the peripheral surface radius 94r of cam 94 facing the stake 29 may increase as it is rotated in direction DD2. Thus, rotation of the cam 94 in direction DD2 may tend to urge stake 29 against stake receptacle wall 24b (or maintain stake 29 abutting stake receptacle wall 24b). Movement of the stake 29 out of the corner 24w in direction DD5 will tend to rotate the cam 94 further in the direction DD2 of increasing peripheral surface radius of the cam, thereby further tightening the compression between the cam 94 and the stake 29. Thus, the cam 94 will tend to resist the movement of the stake 29 out of the corner 24w in direction DD5.

Thus, in the system just described, one cam 94 is structured to be rotatable to exert a biasing force on a stake 29 received in the stake receptacle 24, to urge the stake 29 against one wall (in this case, wall 24b) of the stake receptacle. Also, another cam (in this case, cam 92) is structured to be rotatable to exert a biasing force on the stake 29 to urge the stake against another wall (in this case, wall 24c) of the stake receptacle intersecting the stake receptacle wall 24b. In addition, a rotation direction of the cam 94 needed to increase the biasing force urging the stake 29 against stake receptacle wall 24b may be specified such that movement of the stake 29 in a direction away from the other stake receptacle wall 24c will cause the cam 94 to rotate in the rotation direction needed to increase the biasing force urging the stake 29 against the stake receptacle wall 24b. Also, a rotation direction of the cam 92 needed to increase the biasing force urging the stake 29 against the wall 24c may be specified such that movement of the stake 29 in a direction away from the stake receptacle wall 24b will cause the cam 92 to rotate in the rotation direction needed to increase the biasing force urging the stake 29 against the stake receptacle wall 24c.

Adding a third cam 96 to the cams 92 and 94 shown in the stake pocket inserts 20 and 120 of FIG. 10 may enable a single stake pocket insert design to be used on both sides of the cargo bed. For example, stake pocket insert 120 may include cams 192, 194, and 196, positioned similarly to cams 92, 94, and 96 in stake pocket insert 20. Cam 196 of stake pocket insert 120 may operate rotationally in the same manner as cam 92 of stake pocket insert 20, to force stake 129 against stake receptacle wall 124d. Also, cam 194 of stake pocket insert 120 may operate rotationally in the same manner as cam 94 of stake pocket insert 20, to force stake 129 against stake receptacle wall 124b. In addition, the rotational directions of cams 196 and 194 may be specified so as to resist movement of the stake 129 out of the stake receptacle corner 124w, as previously described with regard to stake pocket insert 20 of FIG. 10. In this manner, stakes 29 and 129 along opposite sidewalls may be biased into respective rear outside corners 24w and 124w of respective stake receptacles 24 and 124. This may serve to align the stakes 29 and 129 along a width direction of the cargo bed.

By incorporating three cams into the stake pocket insert as shown in FIGS. 8A-9B and 11-11C, a stake 29 inserted into the stake-receiving cavity 24h may be biased against any of stake receptacle walls 24b-24d, and into any of the corners defined by intersections of these walls. This may enable a single configuration of the stake pocket insert 20 to be used along either sidewall of the cargo bed. Cams 92, 94, and 96 may be rotated to the configuration shown in FIG. 11A to facilitate insertion of the stake receptacle 24 into the stake pocket 19. After the stake receptacle 24 has been inserted into the stake pocket 19, the cams need to be rotatable as described herein to engage sides of a stake inserted into the stake receptacle 24, to aid in securing the stake within the stake receptacle.

Aspects such as the centers of rotation of the cams, the cam radii, and other cam-related parameters may be determined analytically and/or experimentally given the requirements of a particular application, the geometry of the stake pocket, and other pertinent factors.

Referring to FIGS. 13A-13D, in one or more arrangements, the stake securement mechanism is in the form of one or more pressure members mounted along the first portion of the stake pocket insert so as to be movable in a direction toward a bearing surface. The pressure member is structured to be movable to press against a stake inserted into the stake receiving cavity so as to bias the stake against the bearing surface, thereby securing the stake in the stake pocket insert between the pressure member and the bearing surface.

In one or more arrangements, another pressure member may be mounted along a second portion of the stake pocket insert different from the first portion, the other pressure member being structured to be operable to press against a stake positioned in the stake-receiving cavity, so as to bias the stake against another bearing surface, so as to secure the stake within the stake receptacle between the other pressure member and the other bearing surface.

Referring to FIGS. 13A-13D, for example, one or more pressure members 88 are mounted to the mounting member 22 via threaded members extending through threaded through-holes formed in one or more walls of the mounting member. In the embodiment shown in FIGS. 13A-13D for example, pressure members 88-1 and 88-2 are rotatably attached to associated threaded members 85-1 and 85-2 extending through holes 123-5 and 23-6 formed in walls 22a and 22d of mounting member 22. In the example shown, the pressure members 88-1 and 88-2 are mounted in the mounting member 22. Alternatively, a pressure member may be mounted in a wall of the stake receptacle 24.

Figure 13A:
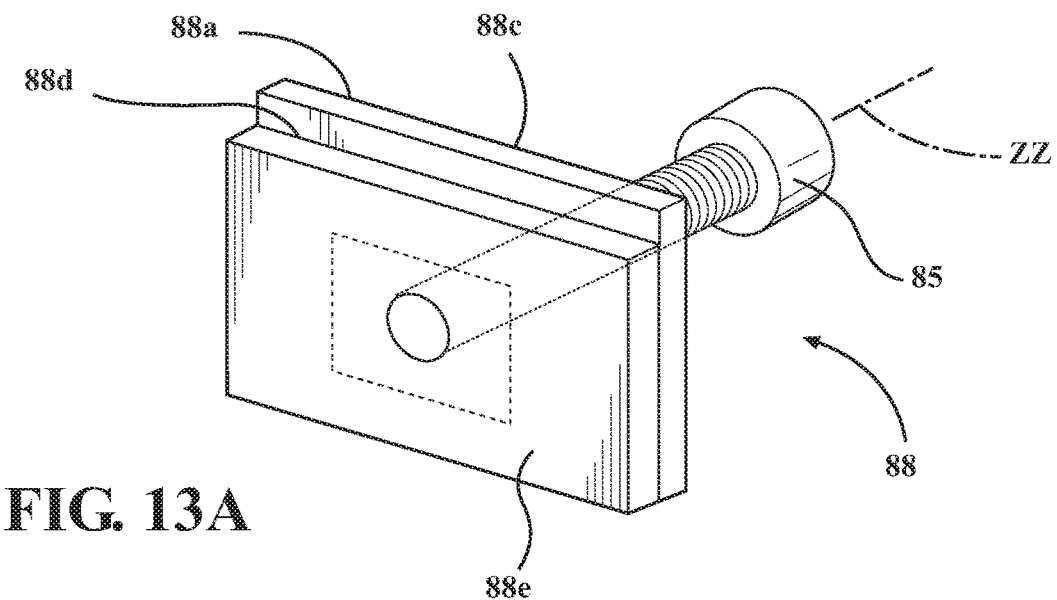
FIG. 13A is a schematic perspective view of a pressure member and attached threaded member, in accordance with an embodiment described herein.
Figure 13D:
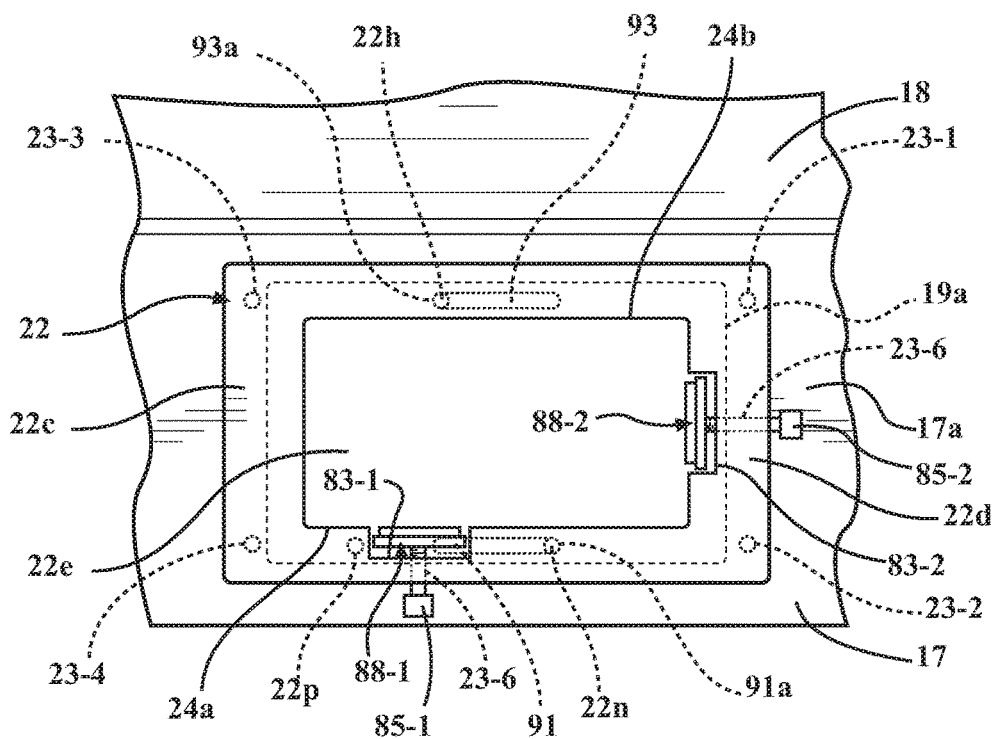
FIG. 13D is schematic plan view of a stake pocket insert as shown in FIG. 13C shown positioned in a stake pocket in a vehicle sidewall prior to insertion of a stake into a stake receptacle of the stake pocket.
Figure 13B:
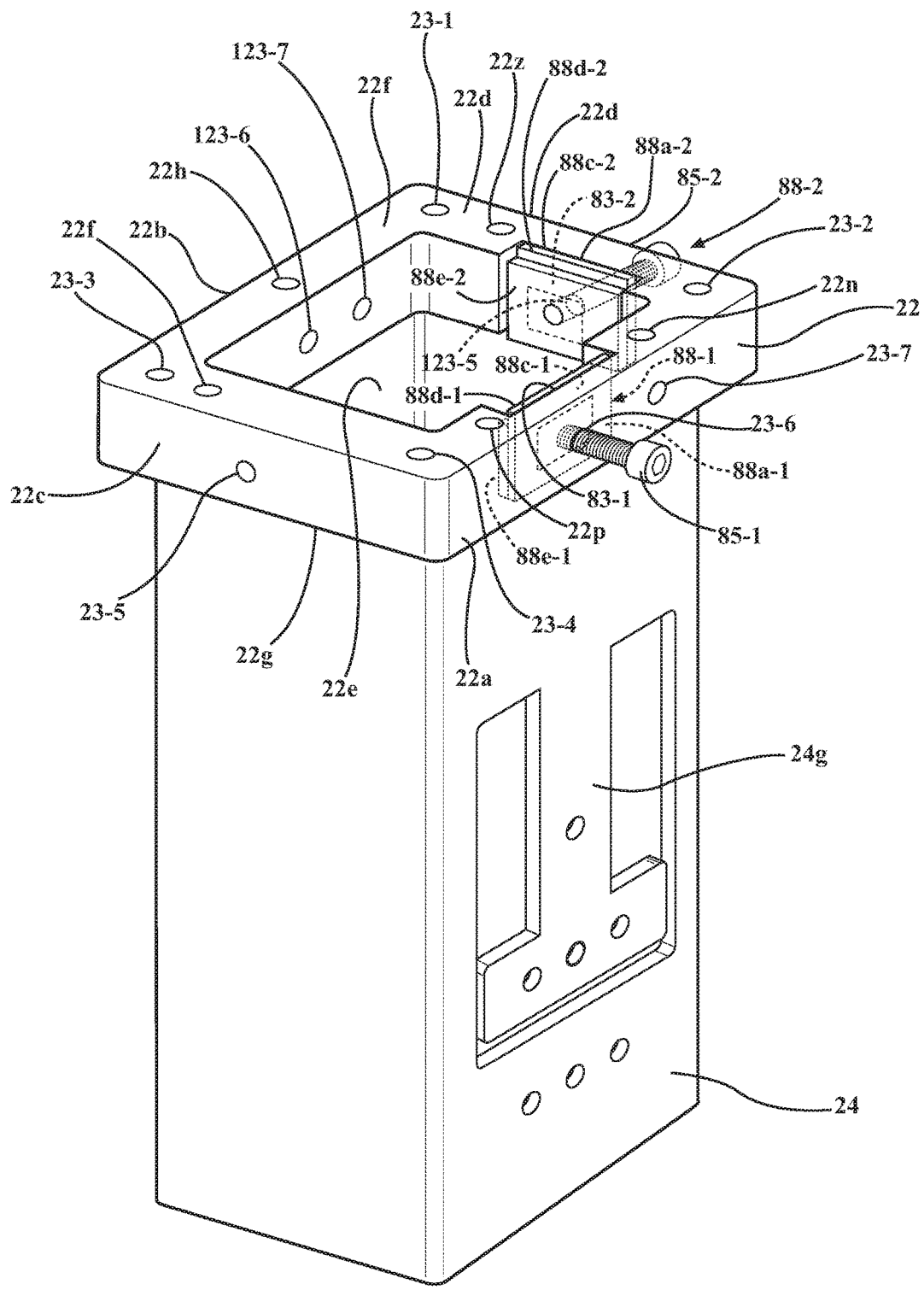
FIG. 13B is a schematic perspective view of a stake pocket insert incorporating a pair of pressure members for exerting biasing forces on a stake positioned in a stake receptacle of the stake pocket insert.

FIG. 13A shows one example of a pressure member 88 usable for the purposes described herein. Referring to FIG. 13A, in one or more arrangements, each of pressure members 88 is formed from a rigid pressure plate 88a which is rotatably secured to an end of an associated threaded member 85, such as a bolt or Allen screw. The pressure plate 88a is attached to an end of the threaded member so as to move with the end of the threaded member 85 along a longitudinal or insertion axis ZZ of the threaded member, and such that the pressure plate 88a may rotate freely about the threaded member insertion axis ZZ. Pressure plate 88a may be formed from any suitably rigid material or structure, for example, steel or a ribbed polymer structure.

One side 88c of the pressure plate 88a receives the threaded member 85 therein or is rotatably attached to the end of the threaded member. An opposite side 88d of the pressure plate 88a is structured to contact a stake positioned in the stake pocket insert. The pressure plate 88a may contact the stake directly along side 88d, or the pressure plate side 88d may have an intermediate contact member 88e (for example, a deformable cushion contact member formed from a rubber or a foam material) mounted on the side 88d. This intermediate contact member 88e may deform slightly when pressed against the stake, enabling the pressure member 88 to be further tightened by rotation of the threaded member 85 after the intermediate contact member 88e contacts the stake. In the embodiment shown in FIGS. 13A-13D, pressure members 88-1 and 88-2 are formed from associated pressure plates 88a-1 and 88a-2 and intermediate contact members 88e-1 and 88e-2. Pressure member 88-1 is attached to mounting member wall 22a by threaded member 85-1 extending into hole 23-6, and pressure member 88-2 is attached to mounting member wall 22d by threaded member 85-2 extending into hole 123-5.

Referring to FIGS. 13A-13D, in a particular embodiment, a cavity 83 may be formed in a wall of the mounting member containing a pressure member, in a side of the wall facing into the mounting member opening 22e. This cavity may enable at least a portion of a pressure member to be recessed into the associated wall to facilitate insertion of a stake into the stake pocket insert. In the embodiment shown in FIGS. 13A-13D, a cavity 83-1 is formed in mounting member wall 22a for receiving all or a portion of pressure member 88-1 therein during insertion of a stake into the stake receptacle 24. Also, a cavity 83-2 is formed in mounting member wall 22d for receiving all or a portion of pressure member 88-2 therein during insertion of a stake into the stake receptacle 24. The threaded members 85-1 and 85-2 may be rotated to retract the pressure members 88-1 and 88-2 into their respective cavities 83-1 and 83-2.

In operation, after insertion of a stake into the stake receptacle 24, threaded member 85-1 may be rotated using an Allen wrench or other tool to cause the end of the threaded member 85-1 and the attached pressure member 88-1 to advance toward the interior of the opening 22e defined by intersecting mounting member walls 22a, 22b, 22c, and 22d, toward mounting member wall 22b. Similarly, threaded member 85-2 may be rotated to cause the end of the threaded member 85-2 and the attached pressure member 88-2 to advance toward the interior of the opening 22e and toward mounting member wall 22c. The threaded members 85-1 and 85-2 may be rotated after a stake is inserted into the stake pocket insert, until the associated pressure members 88-1 and 88-2 contact associated portions of the stake and a desired bearing force is exerted by the pressure members on the stake.

Figure 13C:
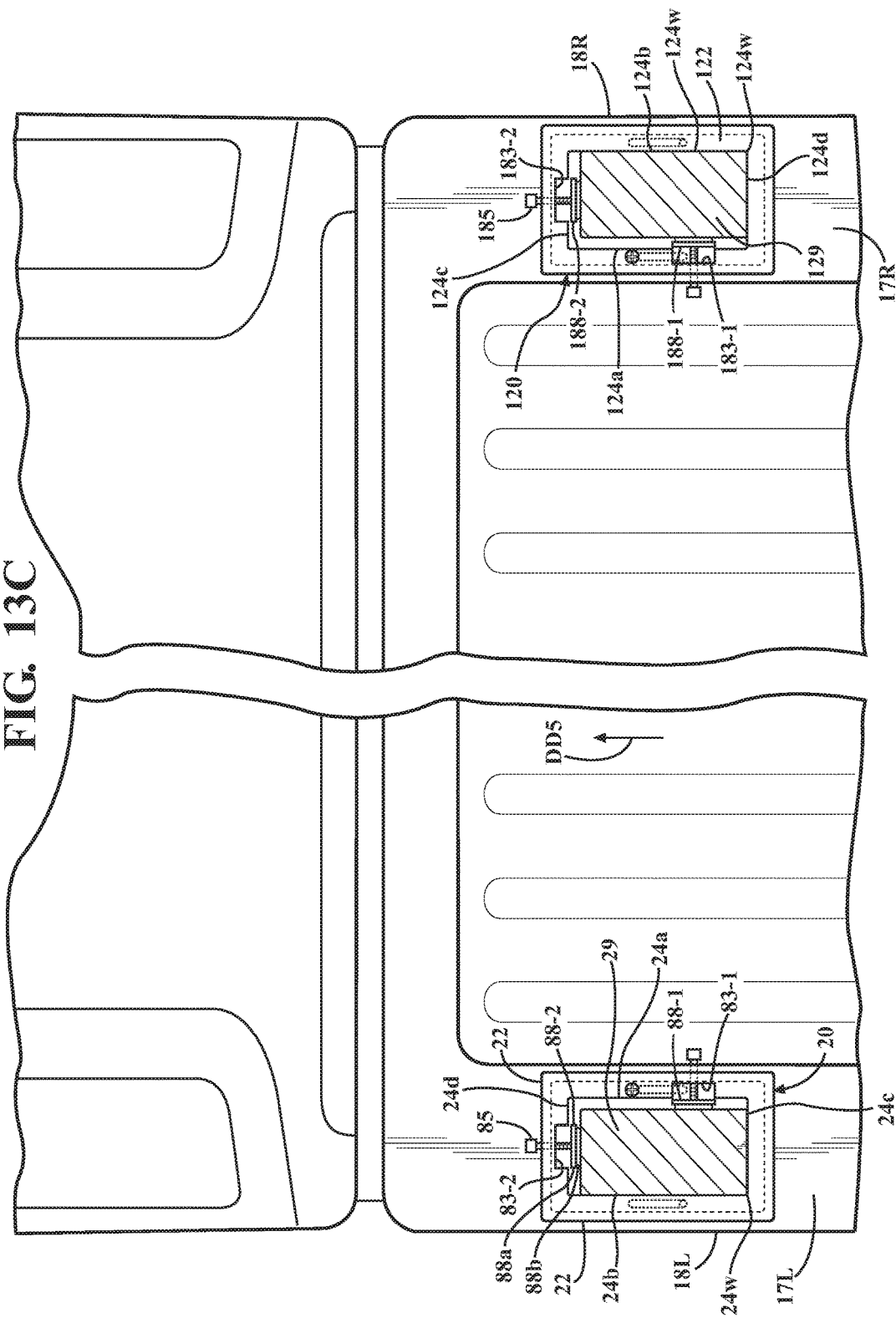
FIG. 13C is a schematic plan view of a portion of a vehicle cargo bed showing stake pocket inserts incorporating pressure members and positioned in respective stake pockets in rails along opposite sidewalls of a cargo bed.

In an embodiment including pressure members 88-1 and 88-2 mounted to the mounting member 22 using both of holes 123-5 and 23-6 as shown in FIGS. 13A-13D, the stake may be biased in a manner similar to the biasing by cams 92 and 94 as previously described with respect to FIG. 10. For example, referring to FIGS. 10 and 13C, pressure member 88-2 may bias stake 29 into mounting member wall 22c and pressure member 88-1 may bias stake 29 into mounting member wall 22b, thereby effectively biasing the stake 29 into corner 24w in a manner similar to the cams 92 and 94 shown in FIG. 10. Referring to FIG. 13, similar pressure members 188-1 and 188-2 (in mounting member wall 22c) may also be mounted to mounting member 122 in associated cavities 183-1 and 183-2 for biasing a stake such as stake 129 into a corner 124w as described previously with respect to FIG. 10, and as shown in FIGS. 13C and 10.

In the example shown, the pressure member 88-1 is surged in a direction away from mounting member wall 22a and toward opposite wall 22b, to press against the stake 29 to bias the stake against the opposite wall 22b. However, a pressure member as described herein may exert pressure on the stake which also (or alternatively) biases the stake against at least one of stake receptacle walls 24a-24d.

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ," as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A stake pocket insert structured to be positionable in a stake pocket of a vehicle cargo bed side wall, the stake pocket insert comprising:
   a stake receptacle defining a stake-receiving cavity,
   a mounting member secured to the stake receptacle and structured to define an opening leading from an exterior of the stake pocket insert into the stake-receiving cavity; and
   a stake securement mechanism mounted along a first portion of the stake pocket insert, wherein the stake securement mechanism is structured to be operable to press against a stake positioned in the stake-receiving cavity so as to bias the stake against a bearing surface, so as to secure the stake within the stake receptacle between the stake securement mechanism and the bearing surface.

2. The stake pocket insert of claim 1 wherein the stake securement mechanism includes a pressure member mounted along the first portion of the stake pocket insert so as to be movable in a direction toward the bearing surface, wherein the pressure member is structured to be operable to press against the stake inserted into the stake receiving cavity so as to bias the stake against the bearing surface, so as to secure the stake within the stake receptacle between the pressure member and the bearing surface.

3. The stake pocket insert of claim 2 further comprising another pressure member mounted along a second portion of the stake pocket insert different from the first portion, the other pressure member being structured to be operable to press against the stake positioned in the stake-receiving cavity so as to bias the stake against another bearing surface, so as to secure the stake within the stake receptacle between the other pressure member and the other bearing surface.

4. The stake pocket insert of claim 1 wherein the stake receptacle includes at least one cam window formed therein, the at least one cam window defining an opening extending from the exterior of the stake pocket insert into the stake-receiving cavity; and
   the stake securement mechanism includes at least one cam rotatably mounted to the mounting member such that a portion of the at least one cam is extendable into the stake-receiving cavity through the at least one cam window, and such that the at least one cam is insertable into the stake pocket to press against the stake positioned in the stake receptacle, so as to bias the stake against a surface positioned opposite the cam.

5. The stake pocket insert of claim 4 wherein the at least one cam is structured to be rotatable to contact the stake received in the stake-receiving cavity while at least a portion of the at least one cam resides within the stake pocket.

6. The stake pocket insert of claim 4 wherein the at least one cam is structured to be rotatable to exert a biasing force on the stake residing within the stake-receiving cavity, the biasing force tending to bias the stake against at least one of a first wall of the stake receptacle and a first wall of the mounting member.

7. The stake pocket insert of claim 6 wherein the stake receptacle further comprises at least another cam window and the stake pocket insert includes at least another cam rotatably mounted to the mounting member such that a portion of the at least another cam is extendable into the stake-receiving cavity through the at least another cam window, and such that the at least another cam is insertable into the stake pocket to press against the stake positioned in the stake receptacle, so as to bias the stake against a bearing surface positioned opposite the at least another cam.

8. The stake pocket insert of claim 7 wherein the at least one cam is structured to be rotatable to exert a biasing force on the stake received in the stake receptacle, to urge the stake against one wall of the stake receptacle, wherein the at least another cam is structured to be rotatable to exert another biasing force on the stake, to urge the stake against another wall of the stake receptacle intersecting the one wall, wherein a rotation direction of the at least one cam needed to increase the biasing force urging the stake against the one wall is specified such that movement of the stake in a direction away from the other wall causes the at least one cam to rotate in the rotation direction needed to increase the biasing force urging the stake against the one wall, and wherein a rotation direction of the at least another cam needed to increase the other biasing force urging the stake against the other wall is specified such that movement of the stake in a direction away from the one wall causes the at least another cam to rotate in the rotation direction needed to increase the other biasing force urging the stake against the other wall.

9. The stake pocket insert of claim 1 wherein the mounting member has at least one stake securement through-hole formed therein, and wherein the at least one stake securement through-hole is structured to enable a stake securement member to be inserted through the at least one stake securement through-hole and into contact with the stake residing in the stake receptacle, to aid in securing the stake within the stake receptacle.

10. The stake pocket insert of claim 1 wherein the mounting member has at least one stake pocket insert securement through-hole formed therein, and wherein the at least one stake pocket insert securement through-hole is structured to receive therein a fastener structured to engage an associated hole formed in the vehicle cargo bed side wall, so as to aid in securing the mounting member to the vehicle cargo bed side wall.

11. The stake pocket insert of claim 1 further comprising at least a first clamp and a second clamp, each clamp being structured and mounted to the mounting member by an associated threaded member so as to be insertable into the stake pocket along a first surface of the vehicle cargo bed side wall and past a second surface of the vehicle cargo bed side wall opposite the first surface to the exterior of the stake pocket,
wherein each clamp is structured and mounted to the mounting member so as to be rotatable in a respective rotation direction to position a first portion of the clamp in contact with at least one of the stake receptacle and the mounting member, thereby preventing further rotation of the clamp in the respective rotation direction,
wherein each clamp is also structured and mounted to the mounting member so as to be rotatable in the respective rotation direction to position a second portion of the clamp directly opposite the second surface of the vehicle cargo bed side wall,
and wherein each clamp is also structured and mounted to the mounting member such that, after the mounting member abuts the first surface of the vehicle cargo bed side wall and the first portion of the clamp is in contact with at least one of the stake receptacle and the mounting member, rotation of the associated threaded member reduces a distance between the clamp and the mounting member until the clamp abuts the second surface of the vehicle cargo bed sidewall, whereby the mounting member is secured to the vehicle cargo bed sidewall.

12. A stake pocket insert structured to be positionable in a stake pocket of a vehicle cargo bed side wall, the stake pocket extending between a first surface of the vehicle cargo bed side wall and a second surface of the vehicle cargo bed side wall opposite the first surface, the stake pocket insert comprising:
a stake receptacle defining a stake-receiving cavity;
a mounting member secured to the stake receptacle and structured to define an opening leading from an exterior of the stake pocket insert into the stake-receiving cavity; and
at least a first clamp and a second clamp, each clamp being structured and mounted to the mounting member by an associated threaded member so as to be insertable into the stake pocket along the first surface of the vehicle cargo bed side wall and past the second surface of the vehicle cargo bed side wall to the exterior of the stake pocket,
wherein each clamp is also structured and mounted to the mounting member so as to be rotatable in a respective rotation direction to position a portion of the clamp directly opposite the second surface of the vehicle cargo bed side wall, and
wherein each clamp is also structured and mounted to the mounting member such that rotation of the associated threaded member after the portion of the clamp is positioned directly opposite the second surface of the vehicle cargo bed side wall reduces a distance between the clamp and the mounting member until the mounting member abuts the first surface of the vehicle cargo bed side wall and the clamp abuts the second surface of the vehicle cargo bed side wall, whereby the mounting member is secured to the vehicle cargo bed side wall.

13. The stake pocket insert of claim 12 wherein each clamp is structured and mounted to the mounting member so as to be rotatable in the respective rotation direction to position the clamp in contact with at least one of the stake receptacle and the mounting member, thereby preventing further rotation of the first clamp in the respective rotation direction, and wherein each clamp is also structured and mounted to the mounting member such that rotation of the associated threaded member after the clamp is in contact with at least one of the stake receptacle and the mounting member reduces the distance between the clamp and the mounting member until the mounting member abuts the first surface of the vehicle cargo bed side wall and the clamp abuts the second surface of the vehicle cargo bed side wall, whereby the mounting member is secured to the vehicle cargo bed side wall.

14. The stake pocket insert of claim 12 wherein the first clamp is mounted to the mounting member so as to be positioned along a first side of the stake pocket, and the second clamp is mounted to the mounting member so as to be positioned along a second side of the stake pocket opposite the first side.

15. The stake pocket insert of claim 12 wherein the stake receptacle includes at least one cam window formed therein, the at least one cam window defining an opening leading from the exterior of the stake pocket insert into the stake-receiving cavity, and wherein the stake pocket insert further comprises at least one cam rotatably mounted to the mounting member such that a portion of the at least one cam is extendable into the stake-receiving cavity through the at least one cam window.

16. The stake pocket insert of claim 12 wherein the stake pocket insert further comprises a pressure member movably secured to a first portion of the stake pocket insert so as to be movable toward a surface positioned opposite the pressure member, wherein the pressure member is structured to be movable to press against a stake inserted into the stake receptacle, so as to bias the stake against the surface.

17. The stake pocket insert of claim 12 further comprising a stake-positioning insert positionable in the stake receptacle, wherein the stake-positioning insert is structured to position within the stake receptacle a stake having a size and/or shape different from a size and/or shape of a stake which the stake-receiving cavity is structured to receive without the stake-positioning insert positioned in the stake-receiving cavity.

18. The stake pocket insert of claim 17 wherein the stake-positioning insert is structured so that insertion of the insert into the stake-receiving cavity defines a region exterior of the stake-positioning insert and within the stake-receiving cavity which is structured to receive the stake therein.

19. The stake pocket insert of claim 12 wherein the stake receptacle includes a flexible wall portion positioned along a first wall of the stake receptacle and structured to face in a direction toward a vehicle cargo bed when the stake pocket insert is positioned in the stake pocket.

20. The stake pocket insert of claim 19 wherein the flexible wall portion has a plurality of flexible wall portion through holes formed therealong, wherein the stake receptacle has a second wall positioned opposite the first wall, wherein the stake receptacle second wall has a plurality of stake receptacle second wall through holes formed therealong, and wherein each through hole of the plurality of flexible wall portion through holes is coaxially aligned with an associated through hole of the plurality of stake receptacle second wall through holes.

* * * * *